United States Patent [19]

Price

[11] 3,755,779

[45] Aug. 28, 1973

[54] ERROR CORRECTION SYSTEM FOR SINGLE-ERROR CORRECTION, RELATED-DOUBLE-ERROR CORRECTION AND UNRELATED-DOUBLE-ERROR DETECTION

[75] Inventor: Donald Walter Price, Lake Katrine, N.Y.

[73] Assignee: International Business Machines Corporation, Armonk, N.Y.

[22] Filed: Dec. 14, 1971

[21] Appl. No.: 207,751

[52] U.S. Cl. .................................... 340/146.1 AL

[51] Int. Cl. .......................................... G06f 11/12

[58] Field of Search ................ 340/146.1 AL, 172.5

[56] References Cited

UNITED STATES PATENTS

| | | | |
|---|---|---|---|
| 3,218,612 | 11/1965 | Sorg | 340/146.1 AL |
| 3,328,759 | 6/1967 | Blaauw et al. | 340/164.1 AL |
| 3,439,331 | 4/1969 | Brown et al. | 340/146.1 AL |
| 3,474,412 | 10/1969 | Rowley | 340/146.1 AL |
| 3,562,709 | 2/1971 | Srinivasan | 340/146.1 AL |
| 3,568,153 | 3/1971 | Kurtz | 340/146.1 AL |
| 3,623,155 | 11/1971 | Hsiao et al. | 340/146.1 AL |
| 3,629,825 | 12/1971 | Bloom | 340/146.1 AL |

*Primary Examiner*—Charles E. Atkinson
*Attorney*—Thomas F. Galvin, Edwin Lester et al.

[57] ABSTRACT

A system for correcting errors in a code word, including means for correcting single errors, means for detecting unrelated double errors and means for correcting related double errors in the code word. The system is particularly applicable to correcting errors in words generated from a memory system in which it is highly probable that if a double error occurs, it will occur in bits which are related to each other.

41 Claims, 11 Drawing Figures

INVENTOR
DONALD W. PRICE

BY Thomas F. Galvin
AGENT

H=

| | DATA BIT POSITIONS (0 1 … 10 … 20 … 30 … 40 … 50 … 60) | CHECK BIT POSITIONS (C1 C4 C9 CT) |
|---|---|---|
| S1 | 1111111100000000111111110000000011111111000000001111111100000000 | 1000000000000 |
| S2 | 1111111111111111000000000000000011111111111111110000000000000000 | 0100000000000 |
| S3 | 0000000000000000111111111111111100000000000000001111111111111111 | 0010000000000 |
| S4 | 1111000011110000111100001111000011110000111100001111000011110000 | 0001000000000 |
| S5 | 1100110011001100110011001100110011001100110011001100110011001100 | 0000100000000 |
| S6 | 1010101010101010101010101010101010101010101010101010101010101010 | 0000010000000 |
| S7 | 1111111111111111000000010001011100000000000000000000000000000000 | 0000001000000 |
| S8 | 0000100100010101111111111111111100001000000000000000000000000000 | 0000000100000 |
| S9 | 0000000100000000000000000000000011111111000000001111111100010000 | 0000000010000 |
| S10 | 0000000000000000000000000000000011110000111101001111000011110001 | 0000000001000 |
| S11 | 0000000000000000000000001000000011001101110011001100110011001010 | 0000000000100 |
| S12 | 1010101110111010101010101010101000000000000000000000000000000110 | 0000000000010 |
| ST | 1111111111111111111111111111111111111111111111111111111111111111 | 1111111111111 |

ERROR CORRECTION SYSTEM FOR SINGLE-ERROR CORRECTION, RELATED-DOUBLE-ERROR CORRECTION AND UNRELATED-DOUBLE-ERROR DETECTION

BACKGROUND OF THE INVENTION

1. Field of the Invention

This invention relates to digital information processing systems and more particularly to the automatic correction and detection of errors in such systems.

2. Description of the Prior Art

Until very recently the computer industry had almost totally relied upon the magnetic core type of memory as its high speed working storage. The manufacturing processes and testing procedures associated with the core memory are now so sophisticated that it is very rare for a core memory that is not 100 percent usable to come out of a manufacturing process. The primary reason for this is that each individual bit storage location or core is separately tested before it is assembled into the final memory; thus, individual core failures are somewhat unusual. The type of failures that normally occur affect a complete row or column of the memory are due usually to some wiring or driver breakdown during operation in the computer, necessitating a complete remanufacture or replacement of the memory.

However, the introduction of a new type of memory, comprising hundreds of data locations within a single integrated semiconductor substrate, has posed a radically different set of problems. It is virtually impossible to inspect individual transistors or data locations during the complicated manufacturing process on a step-by-step basis. Those testing techniques which are used generally occur during a final step in the process or, most often, after the chip fabrication is completed. Moreover, once the memory chip is operative, it is not possible to physically remove a bad circuit. From the standpoint of manufacturing costs and competition with other types of memories, some way of tolerating a certain number of data bit failures in a chip has had to be devised.

One such technique contemplates the use of error correcting codes, such as the well-known Hamming code. The technique comprises providing extra bits with a data word generated from the memory, and, by logically combining the data bit with the extra or check bits, it may be determined whether or not a data word read out is erroneous and whether the code is capable of correcting the error.

So, for example, U. S. Pat. application Ser. No. 51,302 of Carter, et al., filed on June 30, 1970, now U. S. Pat. No. 3,648,239 entitled "A System for Transmitting to and From Single-Error Correction, Double-Error Detection Hamming Code and Byte Parity Code," and assigned to the same assignee as the present application discloses a memory system wherein single error correction-double error detection (SEC/DED) coding is utilized and wherein the necessary hardware is disclosed for developing the necessary syndrome bits required for error correction.

The use of SEC/DED codes to increase computer memory reliability has become very popular. For example, the IBM system 360 Model 85 uses this correction technique had has greatly improved reliability, judged by performance, cost and size. This improvement has been especially evident when the memory system is packaged in a "one-bit-per-module" organization. In this type of memory system, the single large memory is replaced with a number of smaller sub-memories, each with an independent set of drive and sensing circuits. Each memory cell associated with a given code word (data bits plus check bits) is selected from a different basic operational module (BOM). In the one-bit-per-BOM organization, it is highly likely that an error in one data location of a code word will be random and completely unrelated to other data locations in the code word. Thus, a conventional Hamming SEC/DED code performs quite satisfactorily.

The most recent approach to the BOM memory organization has been to use two bits per BOM rather than one. This may be especially useful in large memory systems which use integrated circuit semiconductor chips as the BOM. For a given code word the two-bit-per-BOM memory uses one half the number of chips, resulting in a smaller minimum incremental memory (of course, the same number of storage locations, hence chips, is required for a given memory system). In addition, the decoding logic, commonly fabricated on the same chip as the code words, is less complex for a two-bit-per-BOM memory.

This improvement has not been without a corresponding disadvantage, however, because the ability to correct single errors only is not satisfactory. In a two-bit-per-BOM organization, it is highly likely that the defective circuit which causes an error in one of the bits from a chip will also cause an error in the other bit. In other words, it is highly probable that if an error does occur, it will occur in both related bits. It is also probable that random single errors will occur, but very improbable that random double errors, i.e., errors which appear in the same code word in two unrelated bits, will occur.

Designers in this field have wrestled with the problem of a suitable error correction code for this type of system. Up to the time of this invention they have failed in their efforts.

SUMMARY OF THE INVENTION

It is therefore a principal object of the present invention to improve the error correction and detection associated with memory systems.

It is a further object of the present invention to reliably correct single errors and related double errors and to detect unrelated double errors in information sequences.

These and other objects are provided in an error correction system which is capable of correcting single and related double errors and detecting unrelated double errors. The ECC system of the present invention utilizes three distinct groups of parity check bits in conjunction with an $l$-bit information sequence which consists of two subsets of data bits. Each bit location in the first subset is related to a corresponding bit location in the second set.

The first group of check bits is developed in accordance with an SEC code generated over the first subset and "replicated" over the second subset whereby element values in the data bit positions in the first subset are duplicated in the second subset.

The second group of check bits is developed in accordance with a minimum-3-weight-column SEC code over the first subset. The code is "spread" over the entire set, the term "spreading" being defined below. These two codes, i.e., the replicated SEC code and the minimum 3-weight-column code, in combination provide means for identifying a single bit error and errors in related bits.

The third group of parity check bits is a single check bit developed in accordance with an odd-weight-column parity code whereby the columns of the martix comprised of the codes just described have odd weight. This single check bit yields the added capability of detecting errors in unrelated bits, but will not identify the bits.

In the preferred embodiment of this invention, an $l = 64$ bit word comprises two subsets of $l/2 = 32$ bits having bit locations 0 to 31 and 32 to 63, respectively. Bit locations 0 and 32 derive from a single BOM and are thereby "related." Similarly, locations 1 and 33, 2 and 34, etc., are related, whereas locations 1 and 2, 33 and 34, 2 and 33, are "unrelated." The first two groups of parity check bits require six check bits each and the odd-weight parity code requires a single check bit, thereby requiring 13 check bits for a 64 bit word.

The foregoing and other objects, features and advantages of the invention will be apparent from the following more particular description of preferred embodiments of the invention, as illustrated in the accompanying drawings.

INTRODUCTION

Figure 1:
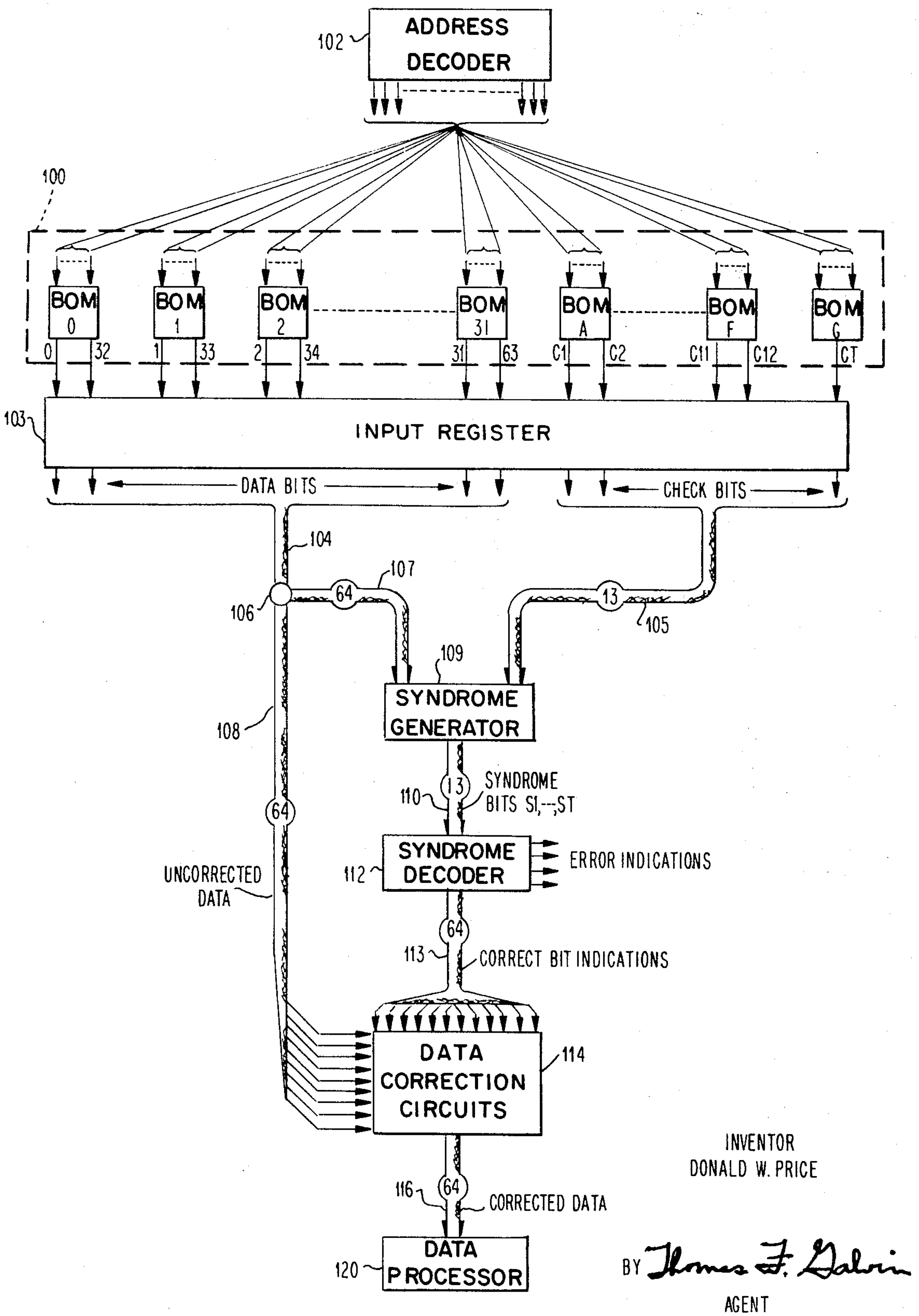
FIGS. 1 and 2 are block diagrams of a computer system in which the present invention is useful.

Prior to discussing the figures of the drawing in detail, a broad functional description of the error correcting code (ECC) system of this invention will be helpful. As previously noted, the ECC of this invention provides for correcting single errors, correcting related double errors and detecting unrelated double errors. The ECC system performs operations on data which is fetched from the main memory and on data entering the main memory.

The kind of ECC system used in this application involves redundancy. It is possible to encode a binary information sequence in such a way that a decoder is able to extract the original information therefrom with a high degree of reliability despite errors which may occur during transmission to and from storage. These ECC systems ordinarily utilize the "parity-check-digit" concept in which a parity check bit is added to each redundant information group.

The check bit for each redundant group is computed in systematic fashion by summing over selected data locations in the information sequence to make the sum of the information and check digits even (or odd) in accordance with a pre-determined decision. In coding parlance the selected data locations are assigned an element value of 1; those locations not selected are assigned an element value of 0. Ordinarily, the selected data locations in one redundant group are different from the locations in any other group.

In the path for data fetched from the main memory, the ECC system receives a codeword consisting of a data field and an input ECC (parity check digit) field. FIG. 1 of this application shows this path. A syndrome generator creates a syndrome bit field from the encoded data and ECC which is the same size as the ECC field. This syndrome field may be thought of as a Syndrome-Error-Vector (SEV), with each vector position corresponding to one of the generated syndrome bits. A syndrome bit Si is the resultant bit created by comparing a check bit in the input ECC field from the main memory with a corresponding check bit of the ECC field generated within the ECC system from the data field. Different SEV patterns generated on various codewords indicate particular error types.

The SEV then enters several decoding areas for error recognition, correction of single- and related double-errors and detection of unrelated double errors. The decoder generates a data correction bit indication for each data bit if that bit is to be corrected. An error indication logic unit within the decoder generates either a No-Error, Correctable-Error or Non-Correctable-Error notification.

The correction bit indication enters a data corrector with the uncorrected data field and the field is corrected if any correction bit was generated.

Figures 2, 3:
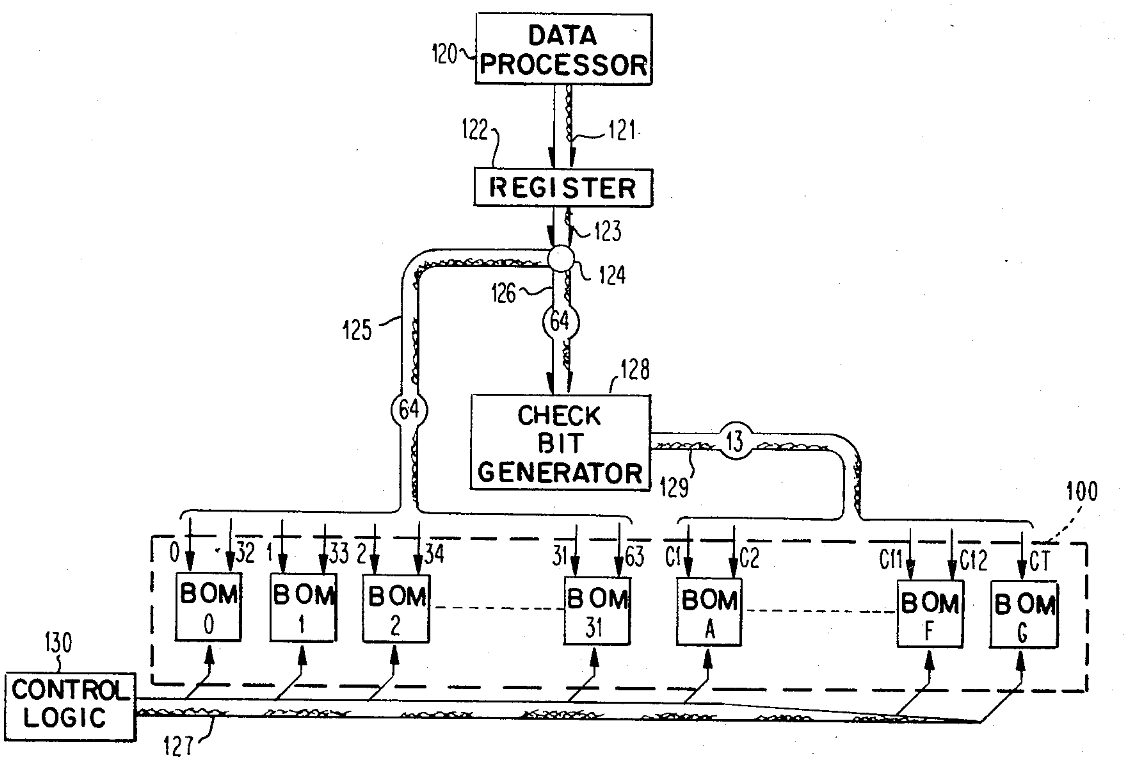
FIG. 3 illustrates a parity check matrix for a ($n = 77$, $l = 64$) code word employed in the preferred embodiment of this invention.

In the path to the main memory a check bit generator or encoder which is a subsection of the ECC system, receives the data field. The data codes the ECC check field and the resulting data and ECC check bits are returned to the main memory as shown in FIG. 2.

DESCRIPTION OF THE PREFERRED EMBODIMENT

Referring now to the drawings and particularly to FIG. 1, the system in which the invention is preferably embodied is a computer having a high-speed main memory 100. Main memory 100 comprises a set of basic operational modules denoted BOM 0, BOM 1, . . . BOM 31 which generate signals which are manifestations of data bits for use in the computer. The memory also comprises BOM A, . . . , BOM G which store check bits Cl, . . . , C12 and CT for use in the coding system which will be described hereafter. In the preferred embodiment it is contemplated that each BOM consists of a semiconductor chip which is fabricated as a matrix array of transistor flip-flops, each flip-flop being capable of generating two signals which are indicative of a bit 0 and bit 1. Such an array is by now well known to those of skill in the art. The array also contains word drivers, bit drivers and sense amplifiers and other circuits which are commonly associated with this kind of system.

It should be noted at this point that this invention is not restricted to the kind of system illustrated. For example, the basic operational module might comprise a discrete array of capacitors or diodes fabricated on cards. In addition, the modules might comprise a magnetic core array such as is illustrated in U.S. Pat. No. 3,436,734 by Pomerene et al. and assigned to the same assignee as the present application. Indeed, the present invention is of even broader scope, not being limited to a system in which two data bits emanate from the same module. The broadest field of use is in any data system where a data bit is so related to another data bit in the code word that it is likely that an error in the first data bit also means that there is an error in the second data bit.

Returning now to FIG. 1, the high speed memory 100 is addressed in standard fashion by address decoder 102 which, in conjunction with other circuitry (not shown for simplicity), operates either to write-in information bits at each data location in the basic operational modules or read-out the information into a data processor. In FIG. 1, the decoder is used for the latter purpose and the data for a selected codeword, as well as the check bits associated therewith are first placed into input register 103. The input register serves to gather the data and check bits in parallel fashion prior to entry into the error correction system. The output from the register is gated conventionally by a clock pulse, at which time the data bits and check bits are transmitted in parallel fashion to the remainder of the system. The data bits 0, . . . , 63 are transmitted through cable 104 to a node junction 106. In certain sections of this specification, data bit numerals will be prefixed by the letter *d* for the sake of clarity. So, for example, data bit 0 may be written as $d(0)$, data bit 63 as $d(63)$, and so forth. These terms will be used interchangeably.

At this point certain of the data or check bits may be assumed to contain errors which the present invention is interested in correcting and/or detecting. Due to the system environment the related data bits 0–32, 1–33, . . . 31–63 or the related check bits C1–C2, . . . C11–C12, will probably both be in error if there is a defect in the sence lines, bit lines or drive circuitry in their respective BOM's. There is also a significant probability of a single error occurring in one of the data or check bits. However, the probability of errors occurring in two unrelated bits, for example, bit 0 and bit 34 or bit 31 and bit C11 is much less likely. Thus, the features of the error checking and correcting system under consideration will correct any single error and any related double error which might occur in the codeword. The system will detect any unrelated double error in the codeword.

The signals from data locations 0, . . . , 63 are transmitted on cable 107 to syndrome generator 109. Signals from the check bit locations C1, . . . , CT are transmitted in parallel fashion along cable 105 to the syndrome generator. The syndrome generator is an encoder which operates on the data and check bit field to compute syndrome bits. In the preferred embodiment the syndrome pattern is 13 bits long, the bits being denoted as S1, S2, . . . S12, and ST.

The syndrome bits are transmitted along cable 110 to syndrome decoder 112. The decoder indicates whether or not there is an error in the codeword, whether the error is correctable, i.e., whether it is a single error or a related double error, or whether the error is not correctable, i.e., whether it is an unrelated double error. As will be explained in more detail in a succeeding section, all of this is deduced by detection of the type of symmetry exhibited by the pattern of bits of the syndrome. The syndrome pattern also yields error indications of the various types of errors which may be detected in the system. The decoder generates correct bit indications on cable 113 which is transmitted to data correction circuits 114. The data correction circuits comprise a set of modulo 2 adders which essentially compare the uncorrected data transmitted from the input register along cable 108 and to the corrected bit indications. The result at the output of the data correction circuits is a correct data word, which comprises the first 64 bits of the codeword. The data is then transmitted through cable 116 to the data processor 120.

Referring now to FIG. 2, after the data processor has no further need for the particular corrected codeword, the processor sends the corrected codeword along cable 121 to a register 122 which is similar to register 103 in function. The 64-bit data word is passed along cable 123 to node 124 where it is sent both to the high speed memory 100 in BOM's 0 to 31 and also to check bit generator 128. The check bit generator is an encoder which operates on the data to compute check bits C1 to CT which are then passed to their respective position in BOMA, . . . , BOM G. The input to the modules is controlled by control logic 130 and the address decoder illustrated in FIG. 1 but not illustrated in FIG. 2 for purposes of similification.

FIG. 3 is a layout of the parity check matrix which illustrates the novel code of this invention. The "H matrix," as it is commonly termed, comprises a data field portion of the code word and a check field. In the present embodiment the data field comprises 64 bits, $d(0)$ to $d(63)$ and the check field comprises 12 check bits, C1 to C12, and a total parity bit CT. Each bit of the codeword is assigned a column vector in H with dimension $r \times 1$.

The check bits are assigned to $r \times 13$ column vectors called the check syndrome column vectors (CSCV). These CSCV C1 to C12 form a $(r-1) \times (r-1)$ identity submatrix as shown under the heading "check bit positions" in FIG. 3. The rth row of the matrix, the total parity row, contains only 1's. Each position in a CSCV corresponds to a particular row posotion of H. For convenience in notation, the CSCV column positions C1 to CT are identified by their corresponding row positions, $i$, where $1 \leq i \leq r = T$.

The data field bits of the codeword, $d(0)$ to $d(63)$ are assigned to $n-r=l$ column vectors called the data syndrome column vectors (DSCV), forming an $r \times l$ submatrix in this portion of H. Each position in a DSCV also corresponds to a particular row position of H.

The syndrome bits S1 to S12 are generated according to the following equation:

$$(1) \qquad Si=\left[\sum_{j=0}^{j=1} d(j)_i\right] \oplus Ci$$

where $d(j)_i$ is the data bit position in a column j containing a symbol 1 in a given row $i$; $Ci$ is the check bit for row $i$; $\Sigma$ is the modulo 2 sum over row $i$; and $\oplus$ is the modulo 2 sum.

So, for example, syndrome bit S1 can be calculated by performing a modulo 2 addition across row 1 of the matrix as follows:

$$S1 = d(0)\oplus d(1)\oplus d(2)\oplus \ldots \oplus d(7)\oplus d(15)\oplus d(16) \oplus \ldots \oplus d(23)\oplus d(32)\oplus d(33)\oplus \ldots \oplus d(39)\oplus d(47)\oplus d(48)\oplus \ldots \oplus d(55)\oplus C1.$$

2.

Syndrome bit ST is generated over all data and check bits:

(3) $$ST=\left[\sum_{j=0}^{j=l} d(j)_T\right]\oplus\sum_{j=1}^{T} Ci$$

For the no-error case, it is the usual practice in the coding to choose the check bit C1 so that S1 equals zero and so on for all syndrome bits. Hence, the syndrome error vector (SEV) of Equation 4 containing all zeros denotes the no-error condition for a code word.

(4) $$SEV = \begin{pmatrix} S1=0 \\ S2=0 \\ S3=0 \\ S4=0 \\ S5=0 \\ S6=0 \\ S7=0 \\ S8=0 \\ S9=0 \\ S10=0 \\ S11=0 \\ S12=0 \\ ST=0 \end{pmatrix} = 0$$

DESIGN OF THE H MATRIX

The H matrix of FIG. 3 is unique because it has the following properties:

I. Any single error or related double error in the code word results in a distinct non-zero SEV which allows the error to be recognized and corrected; and II. An unrelated double error results in an SEV containing non-zero bits in locations distinct from those in I, but generally indistinguishable from an SEV resulting from another unrelated double error.

The design of the H matrix can best be understood by an explanation of how it is constructed. The elements of the matrix are shown in Table I as follows:

TABLE I

CONSTRUCTION OF H-MATRIX

| Data Bit Positions $l$ | | Check Bit Positions $r$ |
|---|---|---|
| $l/2$<br>SEC Code for $l/2$ data bits | $l/2$<br>SEC Code (Replicated) | $(r-1)\times(r-1)$<br>IDENTITY MATRIX |
| MINIMUM-3-WEIGHT-COLUMN-SEC Code for $l/2$ data bits—"spread" over $l$ data bits | | |
| TOTAL PARITY CHECK FIELD | | $l\times r$ matrix |

As is illustrated in Table I, the H matrix comprises: (A) any single-error-correction (SEC) code provided over $l/2$ data bits in the code word and replicated over the other half of the code word. The term "replication" is defined to means that for every data bit position in the code word there is one and only one other data bit position having the same DSCV. These bits are "related." In the preferred embodiment, as indicated in Table I, the SEC code is formed over the first $l/2$ data bits and replicated over the second $l/2$ data bits. This is for graphical simplicity only, however, and it will be appreciated that the related bits, i.e., those having the same DSCV, could occupy any columns in the matrix. (B) A minimum-3-weight-column SEC code provided over the first $l/2$ data bits. The code is then "spread" over the entire field of $l$ data bits. The term "spreading" is defined for each matrix element by the following equation:

$$d(j)_i \oplus d(j + l/2)_i = \hat{d}(j)_i$$ 5 where $\hat{d}(j)_i$ is an element of the minimum3-weight code for the $l/2$ data bits (the original code); $d(j)_i$ and $d(j + l/2)_i$ are related elements in the $l$ bit field (the spread code) derived from equation (5):

(C) A total parity check field, ST. This is for detecting unrelated double errors.

REPLICATED SEC CODE

Table II is an example of a single error correcting code of the Hamming type which has been found useful in the preferred embodiment of this invention. This code, known as the Calvert code, provides the same features and requires essentially the same type of circuitry as the Hamming code. The principal difference between the Hamming and the Calvert codes is the layout of the data bits and the check bits. In the Hamming code, check bits effectively occupy word positions intermixed with data. In other words, corresponding bits of successive bytes of true data do not affect the same check bits. The Calvert code, on the otheer hand, removes the check bits from the data portion of the word and is arranged so that each 8 bit group has the same general check bit configuration with some minor exceptions. Six check bits are used and all of the error detecting and correcting features of the standard SEC Hamming code remain.

TABLE II

| | Data bit positions | | | | | | | | | | | | | | | | | | | | | | | | | | | | | | | | Check bit positions | | | | | |
|---|---|---|---|---|---|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | C1 | C2 | C3 | C4 | C5 | C6 |
| S1 | 1 | 1 | 1 | 1 | 1 | 1 | 1 | 1 | 0 | 0 | 0 | 0 | 0 | 0 | 0 | 1 | 1 | 1 | 1 | 1 | 1 | 1 | 1 | 1 | 0 | 0 | 0 | 0 | 0 | 0 | 0 | 0 | 1 | 0 | 0 | 0 | 0 | 0 |
| S2 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 1 | 0 | 1 | 0 | 0 | 0 | 0 |
| S3 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 0 | 0 | 1 | 0 | 0 | 0 |
| S4 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 1 | 0 | 0 | 0 | 1 | 0 | 0 |
| S5 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 0 | 0 | 0 | 0 | 1 | 0 |
| S6 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 0 | 0 | 0 | 1 |

TABLE III

| | Data bit positions ($\hat{d}$) | | | | | | | | | | | | | | | | | | | | | | | | | | | | | | | | Check bit positions | | | | | |
|---|---|---|---|---|---|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | C1 | C2 | C3 | C4 | C5 | C6 |
| S7 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 1 | 0 | 0 | 0 | 1 | 0 | 1 | 1 | 1 | 1 | 0 | 0 | 0 | 0 | 0 |
| S8 | 0 | 0 | 0 | 0 | 0 | 0 | 0 | 1 | 0 | 0 | 0 | 1 | 0 | 1 | 1 | 1 | 1 | 1 | 1 | 1 | 1 | 1 | 1 | 1 | 1 | 1 | 1 | 1 | 1 | 1 | 1 | 1 | 0 | 1 | 0 | 0 | 0 | 0 |
| S9 | 1 | 1 | 1 | 1 | 1 | 1 | 1 | 1 | 0 | 0 | 0 | 0 | 0 | 0 | 1 | 1 | 1 | 1 | 1 | 1 | 1 | 1 | 1 | 1 | 0 | 0 | 0 | 1 | 0 | 0 | 0 | 0 | 0 | 0 | 1 | 0 | 0 | 0 |
| S10 | 1 | 1 | 1 | 1 | 0 | 0 | 0 | 0 | 1 | 1 | 1 | 1 | 0 | 1 | 0 | 0 | 1 | 1 | 1 | 1 | 0 | 0 | 0 | 0 | 1 | 1 | 1 | 1 | 0 | 0 | 0 | 1 | 0 | 0 | 0 | 1 | 0 | 0 |
| S11 | 1 | 1 | 0 | 0 | 1 | 1 | 0 | 1 | 1 | 1 | 0 | 0 | 1 | 1 | 0 | 0 | 1 | 1 | 0 | 0 | 1 | 1 | 0 | 1 | 1 | 1 | 0 | 0 | 1 | 0 | 1 | 0 | 0 | 0 | 0 | 0 | 1 | 0 |
| S12 | 1 | 0 | 1 | 0 | 1 | 0 | 1 | 1 | 1 | 0 | 1 | 1 | 1 | 0 | 1 | 0 | 1 | 0 | 1 | 0 | 1 | 0 | 1 | 0 | 1 | 0 | 1 | 0 | 1 | 1 | 0 | 0 | 0 | 0 | 0 | 0 | 0 | 1 |

It will be noted that every data bit is included in at least two check bits. Any single bit error in the data portion of the word will change at least two check bits which indicate the position in error. Therefore, for the purposes of this invention, although the Calvert Code is preferred over the standard Hamming Code, in point of fact, either one or the many variations which have appeared in the literature could be used successfully in the practice of the present invention.

By comparing Table II with the H matrix of FIG. 3, it will be seeen that the SEC code of Table II corresponds exactly to the submatrix composed of rows S1 to S6 and columns 0 to 31 in FIG. 3 as well as to the submatrix composed of rows S1 to S6 and Columns 31 to 63. This is replicated SEC code.

The important properties of this replicated SEC code are: first, a single error in the data bits is detectable but not correctable; and, second, a related double error in the data bit yields the same syndrome as the no-error case.

The first property is evident because the SEv for the syndrome bits S1 through S6 is the same for a given data bit in error and for a related data bit. For example, the SEV for $d(0)$ in error is:

$$\text{(6)} \qquad \text{SEV} = \begin{vmatrix} S1 = 1 \\ S2 = 1 \\ S3 = 0 \\ S4 = 1 \\ S5 = 1 \\ S6 = 1 \end{vmatrix}$$

which is the same SEV generated by $d(32)$ in error.

The second property is due to the fact that, because the DSCV for the related bits are the same, errors in the related bits nullify themselves with respect to the SEV generated. This is illustrated for the example where $d(0)$ and $d(32)$ are both in error:

$$\text{(7)} \qquad \text{SEV} = \begin{vmatrix} S1 = 1 \\ S2 = 1 \\ S3 = 0 \\ S4 = 1 \\ S5 = 1 \\ S6 = 1 \end{vmatrix} \oplus \begin{vmatrix} S1 = 1 \\ S2 = 1 \\ S3 = 0 \\ S4 = 1 \\ S5 = 1 \\ S6 = 1 \end{vmatrix} = \begin{vmatrix} 0 \\ 0 \\ 0 \\ 0 \\ 0 \\ 0 \end{vmatrix}$$

which is the same SEV which is generated for the no-error condition.

When combined with the "spread" minimum-3-weight code, the properties of the replicated code are quite useful.

MINIMUM-3-WEIGHT-CODE

Table III illustrates the parity check matrix for a minimum-3-weight-column SEC code useful in the present invention. As far as is known to the present inventor, this particular code has never been described previously and is novel. However, it is not very useful for its single error correction properties alone, as there are other codes of less or equal weight which can perform single error correction over 32 bits. In the present context, however, when used with the replicated SEC code the combination is a very significant advance in the ECC art.

The term "minimum weight" is familiar to those of skill in this art, having been previously defined by Peterson in his book, *Error Correcting Codes*, pp 30–31, as the number of non-zero components in each column of a parity check matrix. Thus, a minimum-3-weight-column code has at least three 1's in each column of the matrix. Inspection of Table III demonstrates that it fulfills the conditions of the minimum-3-weight-column code. It is apparent from basic theorems of linear algebra that numerous other matrices having the properties of a minimum-3-weight-code could be found. For example, a code vector for one column may be interchanged with a code vector from another column without changing the properties of the code.

As already indicated with respect to equation (5) above, the minimum-3weight code devised for $l/2$ data bits is "spread" over $l$ bits. In the H matrix of FIG. 3, the spread code is within the submatrix comprising check field rows S7 to S12 and data bit positions 0 to 63. The term "spreading" can be illustrated in the form of matrix addition as follows:

(8)

$$\begin{bmatrix} \hat{d}(0)_7 & \cdots & \hat{d}(31)_7 \\ & \vdots & \\ \hat{d}(0)_{12} & \cdots & \hat{d}(31)_{12} \end{bmatrix} = \begin{bmatrix} d(0)_7 & \cdots & d(31)_7 \\ & \vdots & \\ d(0)_{12} & \cdots & d(31)_{12} \end{bmatrix} \oplus \begin{bmatrix} d(32)_7 & \cdots & d(63)_7 \\ & \vdots & \\ d(32)_{12} & \cdots & d(63)_{12} \end{bmatrix}$$

where $\hat{d}$ is the symbol used to illustrate the element of the minimum-3-weight-code in Table III and $d$ is the symbol used to illustrate the element in the "spread" code in the H-matrix of FIG. 3. For every $\hat{d}$ element, there are two d elements in FIG. 3, these elements being related bits.

Thus, using the general equation given in equation (5) above, to compute $d(0)_7$ and $d(32)_7$ from $\hat{d}(0)_7$:

$$\hat{d}(0)_7 = d(0)_7 \oplus d(32)_7 \quad 1 = 1 \oplus 0 \qquad (9)$$

Similarly:

$$\hat{d}(0)_8 = d(0)_8 \oplus d(32)_8 \quad 0 = 0 \oplus 0 \qquad (10)$$

and $$\hat{d}(5)_{11} = d(5)_{11} \oplus d(37)_{11} \quad 1 = 0 \oplus 1 \qquad (11)$$

and $$\hat{d}(4)_8 = d(4)_8 \oplus d(35)_8 \quad 0 = 1 \oplus 1 \qquad (12)$$

and so on.

The foregoing illustrates the wide choice available in selecting the positioning of the bits in rows S7 to S12 based on the $\oplus$ function. The only significant limitation lies in the positioning of the bits S7 and S8 which are used to distinguish single errors. It will be recalled that the SEV of bits S1 to S6 of the replicated code is the same for a given data bit in error and its related bit, thereby preventing single error correction. This deficiency is cured by employing any two of the syndrome bits of the spread code to distinguish between an error in a data bit and its related bit. In the present embodiment, syndrome bits S7 and S8 are used to ensure that the DSCV of a data bit is different in locations S7 and S8 than the DSCV of its related bit. The simplest technique is illustrated in FIG. 3. A bit 1 is placed in locations S7 or S8 for bits 0 to 31 and a bit 0 is placed in both locations S7 and S8 for bits 32–63, bit 36 excepted. Bit 36 has a 0, 1 pattern in S7, S8. However, its related bit location, 4, has a 1, 1 pattern in S7, S8. Thus, each data bit in error will yield a unique DSCV over syndrome bits S1 to S8.

In general, the only requirement for single error correction is that the DSCV of a bit be different from that of its related bit. Any of the other syndrome bits S8 to S12 could be employed as well.

The primary importance of the spreading technique lies in the fact that the SEV for a related double error in the spread submatrix (rows S7 to S12, columns 0 to 63) of the H matrix is the same as the SEV of a single-bit in error in Table III. Thus, e.g.:

(13) SEV $\hat{d}(0)$ = SEV $[d(0) \oplus d(32)]$ $$\begin{vmatrix} S7=1 \\ S8=0 \\ S9=1 \\ S10=1 \\ S11=1 \\ S12=1 \end{vmatrix} \begin{matrix} = \\ = \\ = \\ = \\ = \\ = \end{matrix} \begin{vmatrix} 1 \\ 0 \\ 0 \\ 0 \\ 0 \\ 1 \end{vmatrix} \oplus \begin{vmatrix} 0 \\ 0 \\ 1 \\ 1 \\ 1 \\ 0 \end{vmatrix} = \begin{vmatrix} 1 \\ 0 \\ 1 \\ 1 \\ 1 \\ 1 \end{vmatrix}$$

Hence, there is a one-to-one correspondence between related double errors in the spread code and single errors in the original SEC minimum-3-weight column code.

This means that errors in two related bits will generate a unique SEV for syndrome bits S7 to S12, thereby distinguishing a related double error from any other in the data bits.

The requirement that the spread code have a minimum weight of three is to ensure a sufficient number of bits so that each related double error does generate a syndrome pattern different from any other related double error. In the present case, 32 possible related double errors in the data bits and three possible related double errors in the check bits (C7–C8, C9–C10, C11–C12) are uniquely indicated by the syndrome pattern of S7 to S12.

A code with a minimum weight of two could not be used because an unrelated error in the check bits, e.g., C9, C11 might be indistinguishable from a related double error in the data bits.

TOTAL PARITY SYNDROME BIT ST

ST is denoted a total parity syndrome bit because its computation involves all data and other check bits. As previously noted, the value of CT is chosen so that ST = 0 for the no-error case. This bit is generated for the detection of double errors and this property is evident from inspection of FIG. 3. For any single error, ST = 1. In the case of any double error, the errors nullify themselves and ST = 0.

In the present ECC system, ST serves primarily to detect errors in two unrelated bits and to distinguish the syndrome pattern of a single error from that of an unrelated double error.

INTERRELATIONSHIP BETWEEN THE CODES

As previously mentioned, the importance of the separate codes in present ECC systems is limited to the function for which they are originally designed. As single error correction codes, both the Calvert and the minimum-3-weight-column codes are useful but replaceable by any number of other codes, some of which are more convenient in some ways.

In a similar vein, the overall parity check bit for double error detection has its counterpart in the original Hamming code.

It is only when the three codes are combined in a single ECC system that they yield the important result herein described. The interrelationship of the codes can be observed by referring to Table IV which is an exhibit of the syndrome patterns (SEV) generated by the various errors which may be encountered. Table IV is conveniently divided into the no-error, single-error and double-error conditions. For the no-error case, SEV = 0. For the single error case, each data bit position generates a unique syndrome pattern over syndrome bits S1 to S8 when that bit is in error.

TABLE IV.—SYNDROME PATTERNS

| Error conditions | SEV | | | | | | | | | | | | |
|---|---|---|---|---|---|---|---|---|---|---|---|---|---|
| | S1 | S2 | S3 | S4 | S5 | S6 | S7 | S8 | S9 | S10 | S11 | S12 | ST |
| No error | 0 | 0 | 0 | 0 | 0 | 0 | 0 | 0 | 0 | 0 | 0 | 0 | 0 |
| Single errors: | | | | | | | | | | | | | |
| Single data bit in error | ← Unqiue syndrome pattern → | | | | | | | | ← "Don't care" → | | | | 1 |
| Single check bit, Ci, in error (excluding CT) | ← Si=1, all other syndrome bits=0 → | | | | | | | | | | | | 1 |
| Single check bit CT in error | ← Si=0 → | | | | | | | | | | | | 1 |
| Double errors: | | | | | | | | | | | | | |
| Related data bits in error | 0 | 0 | 0 | 0 | 0 | 0 | ← Unique syndrome pattern (wgt. 3) → | | | | | | 0 |
| Related check bits Ci, C(i+1) in error | ← Si and S(i+1)=1, all other syndrome bits=0 → | | | | | | | | | | | | 0 |
| Errors in two unrelated data bits or a data and a check bit * | ← At least one syndrome bit=1 → | | | | | | ← Non-unique syndrome pattern → | | | | | | 0 |
| Unrelated check bits Ci, C(i+m) in error (excluding CT)* | ← Si and S(i+m)=1, all other syndrome bits=0 → | | | | | | | | | | | | 0 |
| Check bits Ci and CT in error * | ← Si=1, all other syndrome bits=0 → | | | | | | | | | | | | 0 |

* The SEV generated for any unrelated double error is dissimilar from any SEV generated for any single error or any related double error.

Syndrome bits S9 to S12 are irrelevant and thus a "don't care" term is inserted in that portion of Table IV. It will be recalled that the same syndrome will be generated when there is a single error in either of two related data bits. Therefore it is necessary to use syndrome locations S7 and S8 to identify which of the two possible related bits is actually in error. This is easily accomplished merely by ensuring that the column vectors in positions S7 and S8 are different for each one of the pair of related bits. For example, with one exception, the column vectors of bits 31 to 63 are 0 at syndrome positions S7 and S8 whereas the vectors for data bits 0 to 31 contain at least a single one in either of the two vector positions S7 and S8. This illustrates the first important interrelationship between the replicated SEC code which encompasses vectors S1 to S6 and the spread code which encompasses S7 to S12.

Referring now to the double-error section of Table IV, it has already been explained that the SEV of related data bits in error is 0 for the first six syndrome bit positions. However, syndrome bits S7 to S12 indicate a unique syndrome pattern for each related double error. It will be recalled that this has been accomplished by ensuring that there is a one-to-one correspondence between the syndrome of a double error in the spread code with the syndrome of a single error in the original minimum-3-weight-column code. The importance of the replicated code with respect to double errors can be appreciated by observing the condition of the syndrome pattern for two unrelated data bits or a data and a check bit in error. It will be observed that the latter condition will yield at least one syndrome bit in positions S1 to S6. This is contrasted from the 0 vector in positions S1 to S6 when related data bits are in error. Thus the combination of the replicated code and the minimum-3-weight code is crucial in the ability to correct, i.e., locate related double errors.

As will be quite evident to those of skill in this art, any code which is developed to correct a 64-bit data word is quite complex and calculations required to ensure that the code operates perfectly are quite tedious. In the present case, of course, these computations are made even more so because this code is capable of detecting three types of errors and correcting two of these errors whereas previous codes had been restricted to single error and double error correction only.

To verify that the code operates perfectly in every possible situation, a computer program was written using PL 1 language and programmed on an IBM 360–75 computer. The computer posited every possible single error, related double error and unrelated double error. The output of the program demonstrates that the SEV for any unrelated double error is not equal to the SEV for any correctable error.

Figure 4:
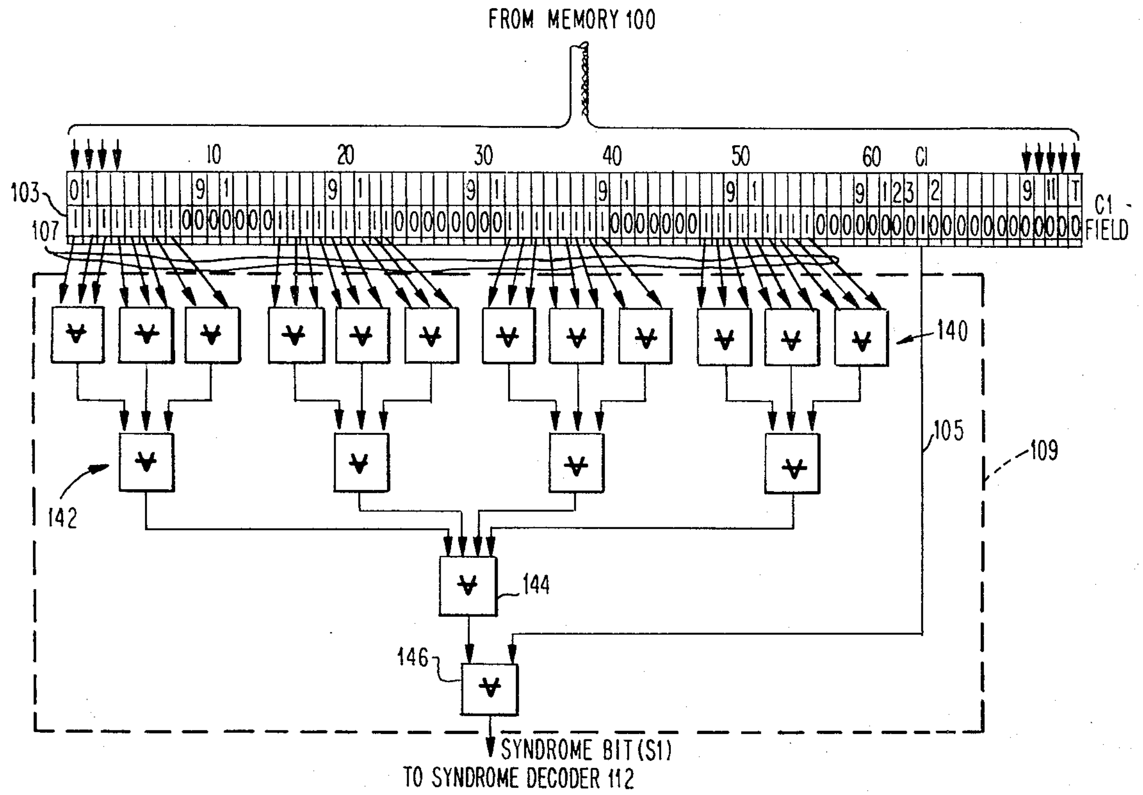
FIG. 4 is a circuit diagram of a syndrome generator for one of the check fields of the parity check matrix of FIG. 3.

FIG. 4 illustrates one section of the syndrome generator 109 which operates on the data and check bit field to generate syndrome bits S1 to ST. The section comprises a tree of EXCLUSIVE OR circuits 120, 142, 144, and 146, each circuit performing a modulo 2 addition. This technique of calculating syndrome bits is well known to those of skill in this art and a detailed discussion of the calculation of each of the syndrome bits is thought to be unnecessary. Readers who desire to pursue this technique are referred to the article by Hsiao in *I.B.M. J. Res. & Development*, July 1970, pp 395–401.

The generation of each syndrome bit Si is accomplished by calculating a check bit from the data bits stored in register 103 termed a syndrome check bit and comparing the calculated syndrome check bit to the check bit stored in register 103. A difference in value between these check bits yields Si = 1, indicating an error condition.

For purposes of illustration, FIG. 4 shows the calculation of one of the syndrome bits, in this case, S1. Assuming that the code word is present in register 103, the EXCLUSIVE OR circuits are connected to each data location which is selected for computation, depending on the locations in the H matrix illustrated in FIG. 3. Hence, for the C1 field illustrated, the EXCLUSIVE OR calculations are made over data bit locations 0 to 7, 15 to 23, 32 to 39, 47 to 55 by circuits 140, 142 and 144. The syndrome check bit so determined from the data is compared in circuit 146 with the bit in check bit location C1 to yield an indication of S1. A similar computation is employed for each of the check bit fields C2 through CT. It will be noted that the syndrome bit ST is a result of an EXCLUSIVE OR calculation over every data bit and every check bit position in the H matrix. Additionally, in an operative system the EXCLUSIVE OR circuits associated with particular data bit positions may be utilized in the calculation of other syndrome bits which are computed over the same bit locations.

Figure 5:
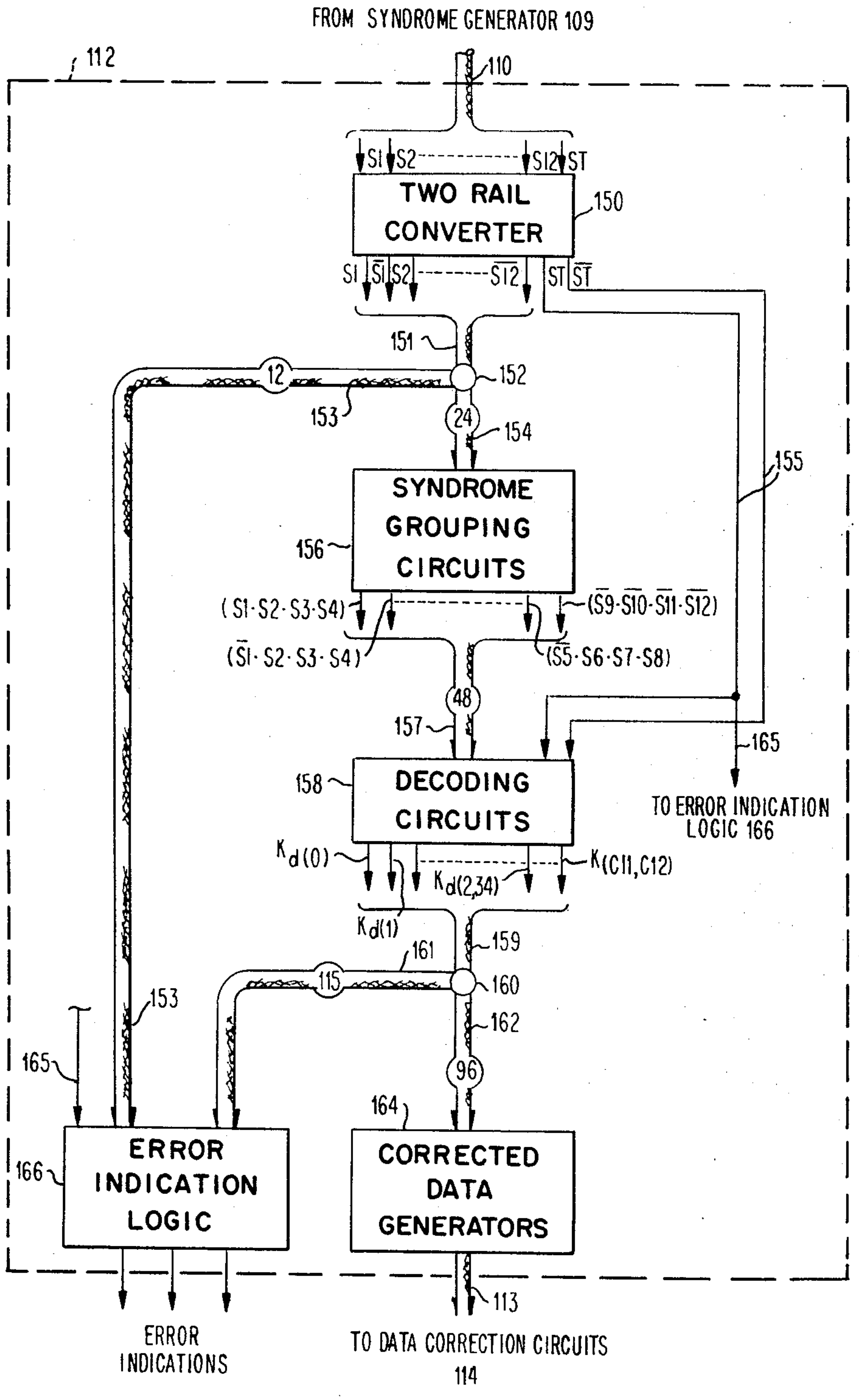
FIG. 5 is a block diagram of the preferred embodiment of the syndrome decoder illustrated in FIG. 1.

The syndrome bits S1 to ST which are encoded in syndrome generator 109 are transmitted to a syndrome decoder 112 over cable 110 as illustrated in FIG. 1. FIG. 5 shows the component circuits which comprise the syndrome decoder 112. As is standard in error correction systems, the syndrome pattern (SEV) generated by the syndrome generator indicates whether or not there is an error in data bits or the check bits by a comparison of the data bits with the check bits in the generator 109. If all of the bits of the 13-bit SEV are 0 then there is no error in the code word generated from the memory. However, one or more 1 bits in the syndrome pattern indicate the various types of errors which can occur and which are detectible and/or correctable by this system as has already been discussed.

Decoder 112 performs three basic functions. First, it provides individual identification of every possible single- and related double-error which may occur. Second, it supplies correct bit indications to data correction circuits. Third, the decoder includes error indication logic which provides external indication of error conditions. The decoder comprises generally a two-rail converter 150, a set of syndrome grouping circuits 156, decoding circuits 158, corrected data generators 164 and error indication logic 166. The syndrome pattern received from generator 109 is passed to a two rail converter which converts each syndrome bit into its true and complement form. Thus, the 13 true syndrome bits S1, S2, . . . , ST are converted into 26 outputs S1, $\overline{S1}$, S2, $\overline{S2}$, . . . , ST, $\overline{ST}$. Besides its conversion function, converter 150 would also include amplifiers for each of the inputs in order to provide signals of sufficient power to cause responses in the remainder of the circuitry.

The true and complement syndrome bits are transmitted along cabling 151 to junction node 152 where the true syndrome bits S1, S2, . . . , ST are transmitted along cable 153 and connection 155 to error indication logic block 166. The logic block will be described in a later section of the specification with regard to FIG. 9. The true and complement syndrome bits, with the exception of bits ST and $\overline{ST}$, are transmitted to the syndrome grouping circuits 156 which are a set of 48 'AND' gates shown in detail in FIG. 6. The grouping circuits collect sets of four syndrome bits and yield an intermediate output indication of every possible logical combination of the grouped bits. Thus, the outputs of the grouping circuits include S1·S2·S3·S4, $\overline{S1}$·S2·S3·S4, S1·$\overline{S2}$·S3·S4, and so on for this group of syndrome bits. Similar outputs are provided for bit groups [S5, S6, S7 S8] and [S9, S10, S11, S12].

These 48 outputs are transmitted through cable 157 to the decoding circuits 158. The decoding circuits generate individual output signals, K, for each syndrome pattern indicative of a single error or a related double data or check bit error. In the present embodiment there are 115 such outputs indicative of 64 possible single data errors, 13 possible single check bit errors, 32 possible related data errors and six possible related check bit errors.

The outputs from the decoding circuits 158 are passed through cabling 159 to junction node 160 where they are terminated at both error indication logic 166 and corrected data generators 164. The corrected data generators operate on the outputs from the decoding circuits 158 to generate indications of which data bit or bits are to be corrected. These indications are then passed on to the data correction circuits 114 (FIG. 1) to generate corrected data bits for use in the high speed processor 120.

Figure 6:
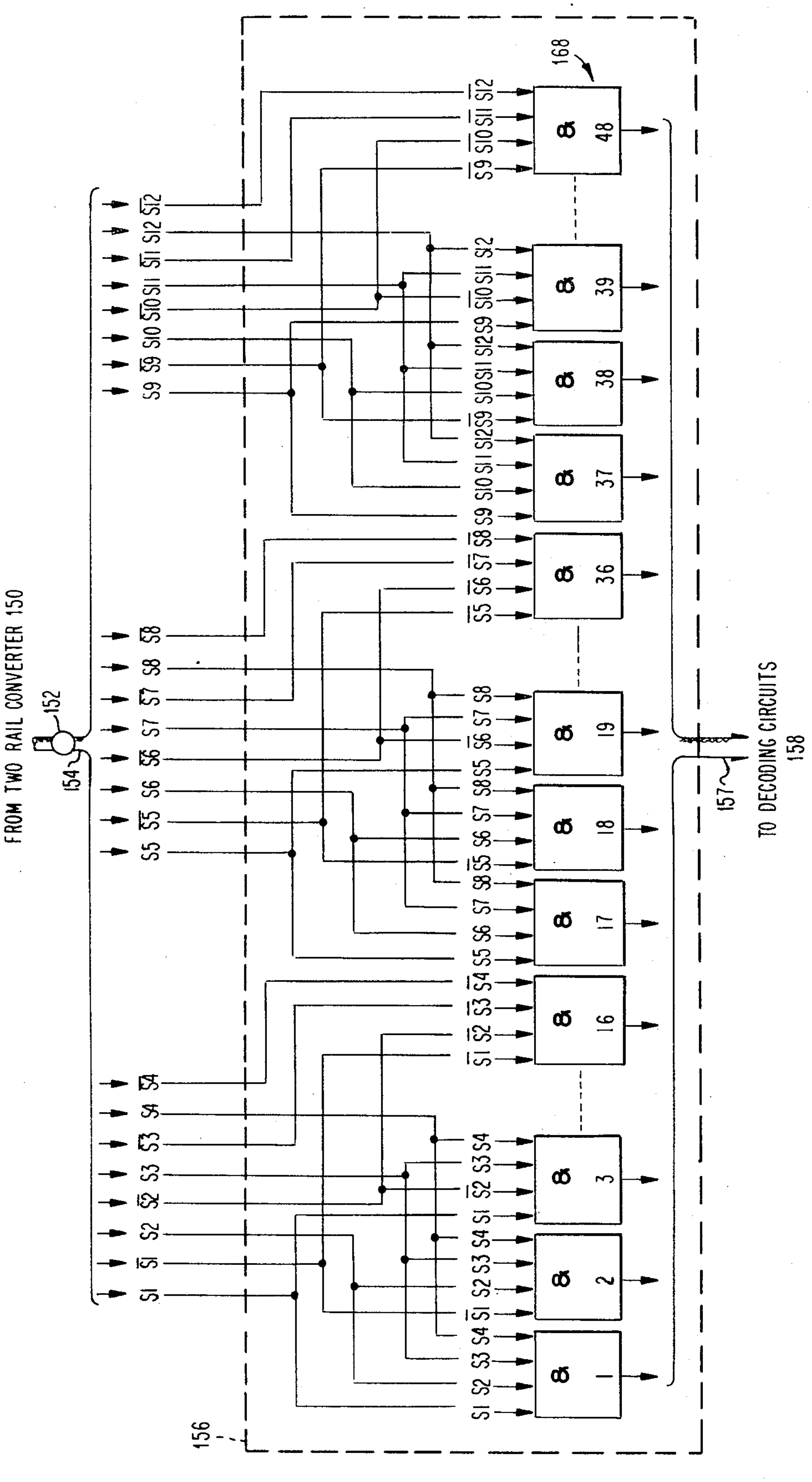
FIG. 6 is a circuit diagram of the syndrome grouping circuits illustrated in FIG. 5.

FIG. 6 illustrates the syndrome grouping circuits 156 which comprise a section of the syndrome decoder 112. As previously mentioned, the grouping circuits comprise a series of AND gates 168, each of which yield an output when all of the inputs to the gate are at a 1 level. These 48 AND gates yield every possible combination of the AND function for the sets (S1, $\overline{S1}$, S2, $\overline{S2}$, S3, $\overline{S3}$, S4, $\overline{S4}$), (S5, $\overline{S5}$, S6, $\overline{S6}$, S7, $\overline{S7}$, S8, $\overline{S8}$) and S9, $\overline{S9}$, S10, $\overline{S10}$, S11, $\overline{S11}$, S12, $\overline{S12}$). It is obvious that the grouping circuits are used simply for the convenience of hardware implementation of the decoder. From the standpoint of the circuitry required to perform the invention, the grouping cicuits are unnecessary.

Figure 7:
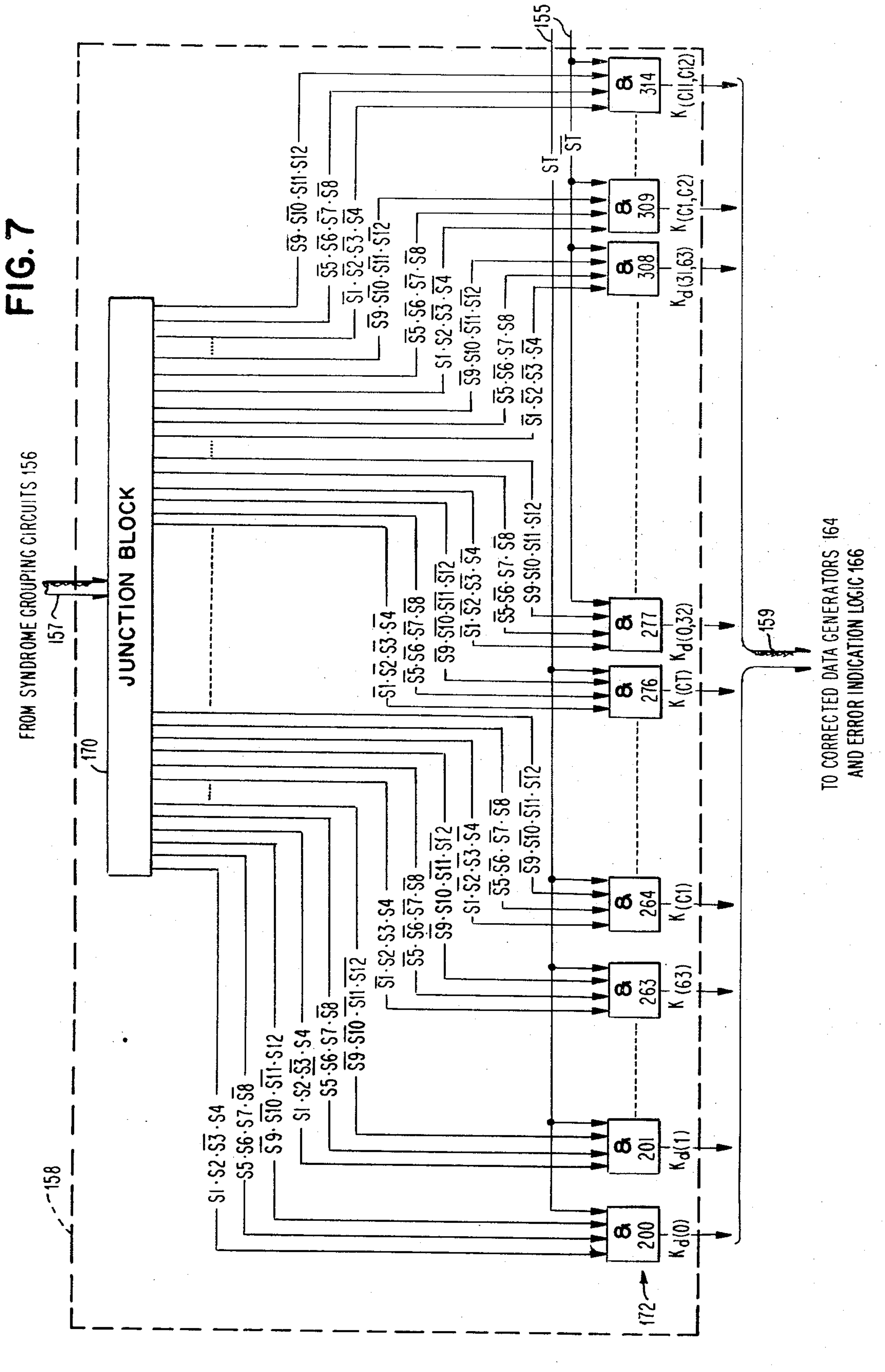
FIG. 7 is a circuit diagram of the decoding circuits illustrated in FIG. 5.

FIG. 7 illustrates the decoding circuits 158 of syndrome decoder 112. The grouped syndrome indications from grouping circuits 156 are distributed from junction block 170 to a set of AND gates 172. The inputs to the AND gates also include syndrome bit ST received from converter 150 on lines 155. Each AND gate 172 yields an output signal K indicative of an individual syndrome pattern. Each pattern corresponds to a syndrome error vector (SEV) which is uniquely descriptive of a correctable error, as has already been discussed with regard to FIG. 3. The outputs from AND gates 200 to 263 are denoted as $K_{d(0)}$, $K_{d(1)}$, . . . $K_{d(63)}$. An output signal from one of these gates indicates that the SEV of a corresponding data bit has occurred, thereby flagging the bit as being erroneous. So, for example, an output from AND gate 200 indicates that the following function has occurred:

$$K_{d(0)} = S1\cdot S2\cdot\overline{S3}\cdot S4\cdot S5\cdot S6\cdot S7\cdot\overline{S8}\cdot\overline{S9}\cdot\overline{S10}\cdot\overline{S11}\cdot S12\cdot ST \qquad 14$$

This function, of course, corresponds to the data syndrome column vector (DSCV) illustrated in FIG. 3 for data bit 0.

The same reasoning applies for the indicators $K_{C1}$, $K_{C2}$, . . . $K_{CT}$ of AND gates 264 to 276. For example, an output from gate 264 indicates an error in C1 because the input function is:

$$K_{C1} = S1\cdot\overline{S2}\cdot\overline{S3}\cdot\overline{S4}\cdot\overline{S5}\cdot\overline{S6}\cdot\overline{S7}\cdot\overline{S8}\cdot\overline{S9}\cdot\overline{S10}\cdot\overline{S11}\cdot\overline{S12}\cdot ST \qquad 15$$

Referring to FIG. 3, it is seen that this function corresponds to the DSCV of C1.

Further discussion of the error indications for the single errors would be superfluous, as the input function to each AND gate 200 to 276 corresponds to the DSCV of the data and check bits of FIG. 3 in respective order.

The SEV for the related double errors are decoded at AND gates 277 to 314. The derivation of the SEV for the double errors is not quite as evident as for single errors; and Table V shows the SEV for each possible related double error for the data bits and the check bits correlated to the AND gate which generates the particular function.

The patterns shown in Table V are more detailed than those illustrated in the previous tables for related double errors. However, the patterns are the same; for example, the replicated SEC code ensures that the SEV of bits S1 to S6 = 0 for related double errors as indicated in Table V. Similarly, ST = 0 for related double errors.

TABLE V

| Output indication | AND gate | Input SEV function S1 | S2 | S3 | S4 | S5 | S6 | S7 | S8 | S9 | S10 | S11 | S12 | ST |
|---|---|---|---|---|---|---|---|---|---|---|---|---|---|---|
| $K_{d(0, 32)}$ | 277 | 0 | 0 | 0 | 0 | 0 | 0 | 1 | 0 | 1 | 1 | 1 | 1 | 0 |
| $K_{d(1, 33)}$ | 278 | 0 | 0 | 0 | 0 | 0 | 0 | 1 | 0 | 1 | 1 | 1 | 0 | 0 |
| $K_{d(2, 34)}$ | 279 | 0 | 0 | 0 | 0 | 0 | 0 | 1 | 0 | 1 | 1 | 0 | 1 | 0 |
| $K_{d(3, 35)}$ | 280 | 0 | 0 | 0 | 0 | 0 | 0 | 1 | 0 | 1 | 1 | 0 | 0 | 0 |
| $K_{d(4, 36)}$ | 281 | 0 | 0 | 0 | 0 | 0 | 0 | 1 | 0 | 1 | 0 | 1 | 1 | 0 |
| $K_{d(5, 37)}$ | 282 | 0 | 0 | 0 | 0 | 0 | 0 | 1 | 0 | 1 | 0 | 1 | 0 | 0 |
| $K_{d(6, 38)}$ | 283 | 0 | 0 | 0 | 0 | 0 | 0 | 1 | 0 | 1 | 0 | 0 | 1 | 0 |
| $K_{d(7, 39)}$ | 284 | 0 | 0 | 0 | 0 | 0 | 0 | 1 | 1 | 1 | 0 | 1 | 1 | 0 |
| $K_{d(8, 40)}$ | 285 | 0 | 0 | 0 | 0 | 0 | 0 | 1 | 0 | 0 | 1 | 1 | 1 | 0 |
| $K_{d(9, 41)}$ | 286 | 0 | 0 | 0 | 0 | 0 | 0 | 1 | 0 | 0 | 1 | 1 | 0 | 0 |
| $K_{d(10, 42)}$ | 287 | 0 | 0 | 0 | 0 | 0 | 0 | 1 | 0 | 0 | 1 | 0 | 1 | 0 |
| $K_{d(11, 43)}$ | 288 | 0 | 0 | 0 | 0 | 0 | 0 | 1 | 1 | 0 | 1 | 0 | 1 | 0 |
| $K_{d(12, 44)}$ | 289 | 0 | 0 | 0 | 0 | 0 | 0 | 1 | 0 | 0 | 0 | 1 | 1 | 0 |
| $K_{d(13, 45)}$ | 290 | 0 | 0 | 0 | 0 | 0 | 0 | 1 | 1 | 0 | 1 | 1 | 0 | 0 |
| $K_{d(14, 46)}$ | 291 | 0 | 0 | 0 | 0 | 0 | 0 | 1 | 1 | 1 | 0 | 0 | 1 | 0 |
| $K_{d(15, 47)}$ | 292 | 0 | 0 | 0 | 0 | 0 | 0 | 1 | 1 | 1 | 0 | 0 | 0 | 0 |
| $K_{d(16, 48)}$ | 293 | 0 | 0 | 0 | 0 | 0 | 0 | 0 | 1 | 1 | 1 | 1 | 1 | 0 |
| $K_{d(17, 49)}$ | 294 | 0 | 0 | 0 | 0 | 0 | 0 | 0 | 1 | 1 | 1 | 1 | 0 | 0 |
| $K_{d(18, 50)}$ | 295 | 0 | 0 | 0 | 0 | 0 | 0 | 0 | 1 | 1 | 1 | 0 | 1 | 0 |
| $K_{d(19, 51)}$ | 296 | 0 | 0 | 0 | 0 | 0 | 0 | 0 | 1 | 1 | 1 | 0 | 0 | 0 |
| $K_{d(20, 52)}$ | 297 | 0 | 0 | 0 | 0 | 0 | 0 | 0 | 1 | 1 | 0 | 1 | 1 | 0 |
| $K_{d(21, 53)}$ | 298 | 0 | 0 | 0 | 0 | 0 | 0 | 0 | 1 | 1 | 0 | 1 | 0 | 0 |
| $K_{d(22, 54)}$ | 299 | 0 | 0 | 0 | 0 | 0 | 0 | 0 | 1 | 1 | 0 | 0 | 1 | 0 |
| $K_{d(23, 55)}$ | 300 | 0 | 0 | 0 | 0 | 0 | 0 | 1 | 1 | 1 | 0 | 1 | 0 | 0 |
| $K_{d(24, 56)}$ | 301 | 0 | 0 | 0 | 0 | 0 | 0 | 0 | 1 | 0 | 1 | 1 | 1 | 0 |
| $K_{d(25, 57)}$ | 302 | 0 | 0 | 0 | 0 | 0 | 0 | 0 | 1 | 0 | 1 | 1 | 0 | 0 |
| $K_{d(26, 58)}$ | 303 | 0 | 0 | 0 | 0 | 0 | 0 | 0 | 1 | 0 | 1 | 0 | 1 | 0 |
| $K_{d(27, 59)}$ | 304 | 0 | 0 | 0 | 0 | 0 | 0 | 1 | 1 | 1 | 1 | 0 | 0 | 0 |
| $K_{d(28, 60)}$ | 305 | 0 | 0 | 0 | 0 | 0 | 0 | 0 | 1 | 0 | 0 | 1 | 1 | 0 |
| $K_{d(29, 61)}$ | 306 | 0 | 0 | 0 | 0 | 0 | 0 | 1 | 1 | 0 | 0 | 0 | 1 | 0 |
| $K_{d(30, 62)}$ | 307 | 0 | 0 | 0 | 0 | 0 | 0 | 1 | 1 | 0 | 0 | 0 | 1 | 0 |
| $K_{d(31, 63)}$ | 308 | 0 | 0 | 0 | 0 | 0 | 0 | 1 | 1 | 0 | 1 | 0 | 0 | 0 |
| $K_{C1, C2}$ | 309 | 1 | 1 | 0 | 0 | 0 | 0 | 0 | 0 | 0 | 0 | 0 | 0 | 0 |
| $K_{C3, C4}$ | 310 | 0 | 0 | 1 | 1 | 0 | 0 | 0 | 0 | 0 | 0 | 0 | 0 | 0 |
| $K_{C5, C6}$ | 311 | 0 | 0 | 0 | 0 | 1 | 1 | 0 | 0 | 0 | 0 | 0 | 0 | 0 |
| $K_{C7, C8}$ | 312 | 0 | 0 | 0 | 0 | 0 | 0 | 1 | 1 | 0 | 0 | 0 | 0 | 0 |
| $K_{C9, C10}$ | 313 | 0 | 0 | 0 | 0 | 0 | 0 | 0 | 0 | 1 | 1 | 0 | 0 | 0 |
| $K_{C11, C12}$ | 314 | 0 | 0 | 0 | 0 | 0 | 0 | 0 | 0 | 0 | 0 | 1 | 1 | 0 |

Figure 8:
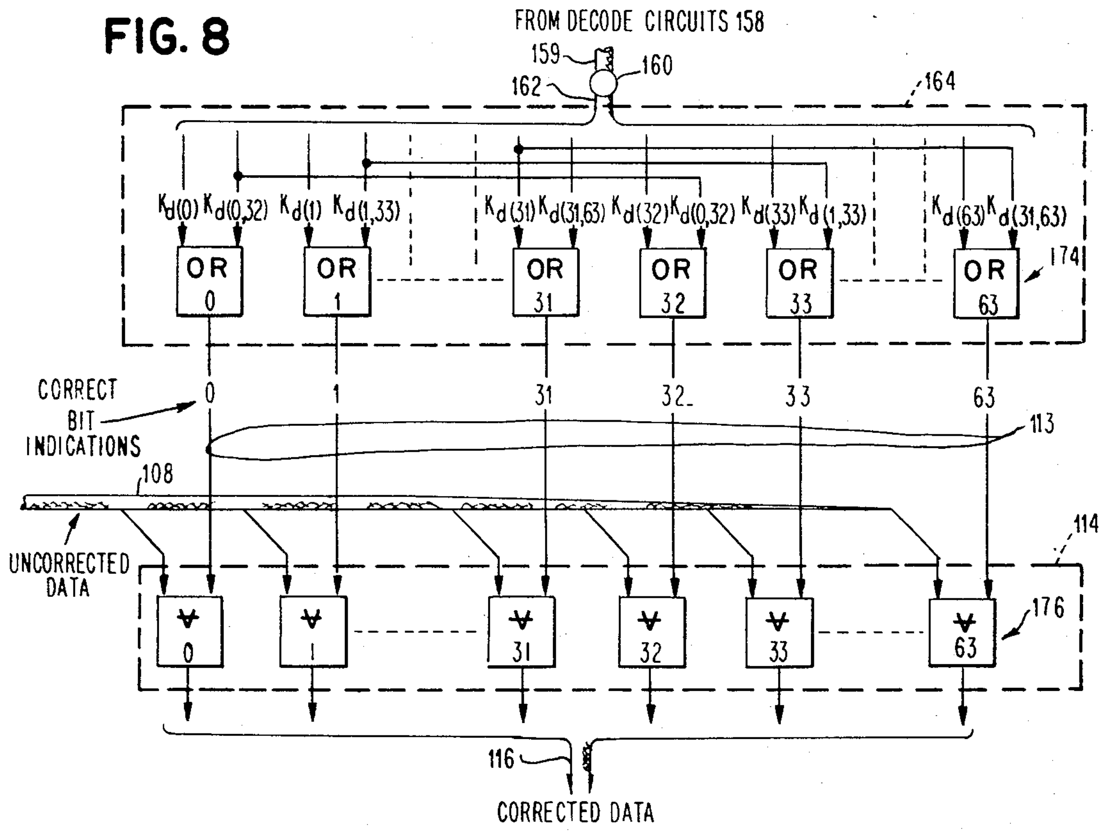
FIG. 8 is a circuit diagram of the corrected data generators shown in FIG. 5 and the data correction circuits shown in FIG. 1.

FIG. 8 illustrates the corrected data generators 164 of the syndrome decoder 112 and the data correction circuits 114 of the ECC system. The corrected data generators function to generate a correct bit indication in response to error signals K from the decoding circuits 158. For this purpose the generators comprise a series of OR gates 174, each gate 0–63 assigned a corresponding data bit location 0–63. Each OR gate generates an output if the decoding circuits indicate that a single error occurred in the corresponding bit location or errors occurred in that bit location and in its related bit location. So, for example, OR 0 generates a correct bit indication if either $K_{d(0)}$ or $K_{d(0, 32)}$ is on; and an output from OR 0 indicates that the data bit position 0 is in error and must be changed. Conversely, if $K_{d(0, 32)}$ were on both OR 0 and OR 32 would generate correct bit indications for locations 0 and 32.

To generate corrected data bits which may be used by the data processor 120, the uncorrected data from the input register of the main store 100 is compared to the correct bit indications in data correction circuits 114. These circuits are EXCLUSIVE OR circuits 176, one for each data bit which operate to change the uncorrected data if the input from the corresponding corrected data generator OR gate is 1. This is illustrated in Table VI.

TABLE VI

| | Input From OR GATE | Input From Uncorrected Data | Corrected Data Output |
|---|---|---|---|
| Error Indication | 1 | 1 | 0 |
| | 1 | 0 | 1 |
| No-Error Indication | 0 | 1 | 1 |
| | 0 | 0 | 0 |

For example, if the output of OR gate 0 is 1, indicating an error in the $d(0)$ location, then the output from EXCLUSIVE OR gate 0 is always the reverse of the signal on the $d(0)$ line of the uncorrected data.

Figure 9:
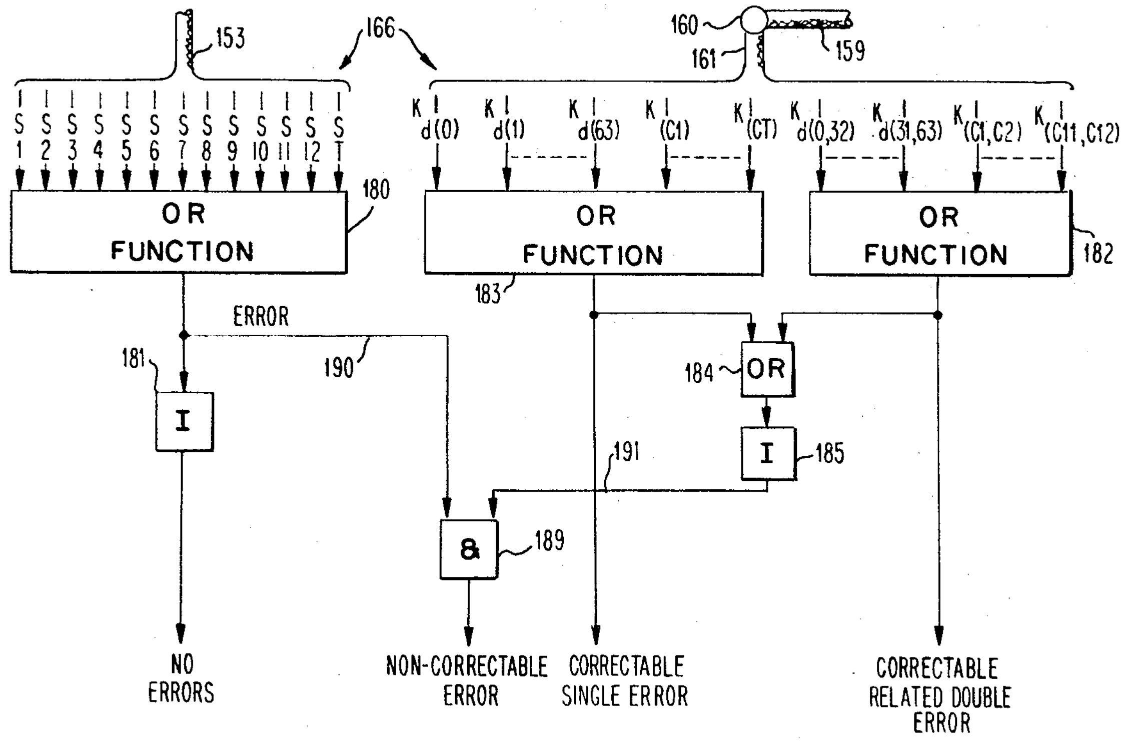
FIG. 9 is a circuit diagram of error indication logic illustrated in FIG. 5.

FIG. 9 illustrates error indication logic 166 which generates signals indicative of the possible condition of a codeword. The syndrome pattern S1 to ST is input to OR-function block 180 from converter 150 (FIG. 5). The OR block represents a tree of OR circuits operative to provide a 1 output if any syndrome bit is 1, indicating an error condition. If the syndrome pattern is 0, the output of OR block 180 is 0. The 0 signal is inverted by gate 181 to provide a "no-error" signal.

An error signal from block 180 is transmitted to AND gate 184 on line 190. The other input to the AND gate is received from OR gate 184 through Inverter 185. OR gate 184 is gated by a signal from either one of OR function blocks 182 or 183. The inputs to OR block 182 comprise the correctable double error indications $K_{d(0,32)}$ . . . $K_{C11,C12}$ which are transmitted from the decoding circuits 158 through cable 159 (FIG. 5). Similarly, the inputs to OR block 183 comprise the correctable single error indications $K_{d(0)}$ . . . $K_{(CT)}$. An output from block 183 provides a "correctable single error" indication; an output from block 182 provides a "correctable related double error" indication.

If the output of OR gate 184 is 0, indicating that no correctable errors are present, the output from inverter 185 is 1 and is transmitted to AND gate 189 through line 191. AND gate 189 functions to provide a "non-correctable error" indication when an error signal from block 180 coincides with a non-correctable error signal from inverter 185.

Figure 10:
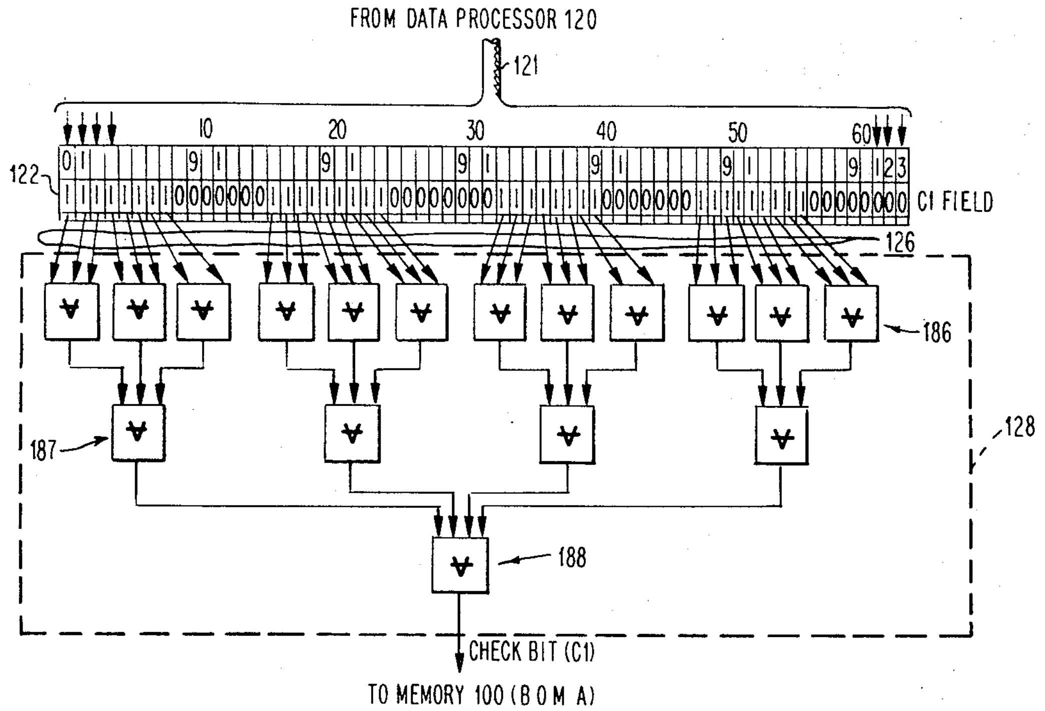
FIGS. 10 and 11 are circuit diagrams of certain sections of the check bit generator illustrated in FIG. 2.
Figure 11:
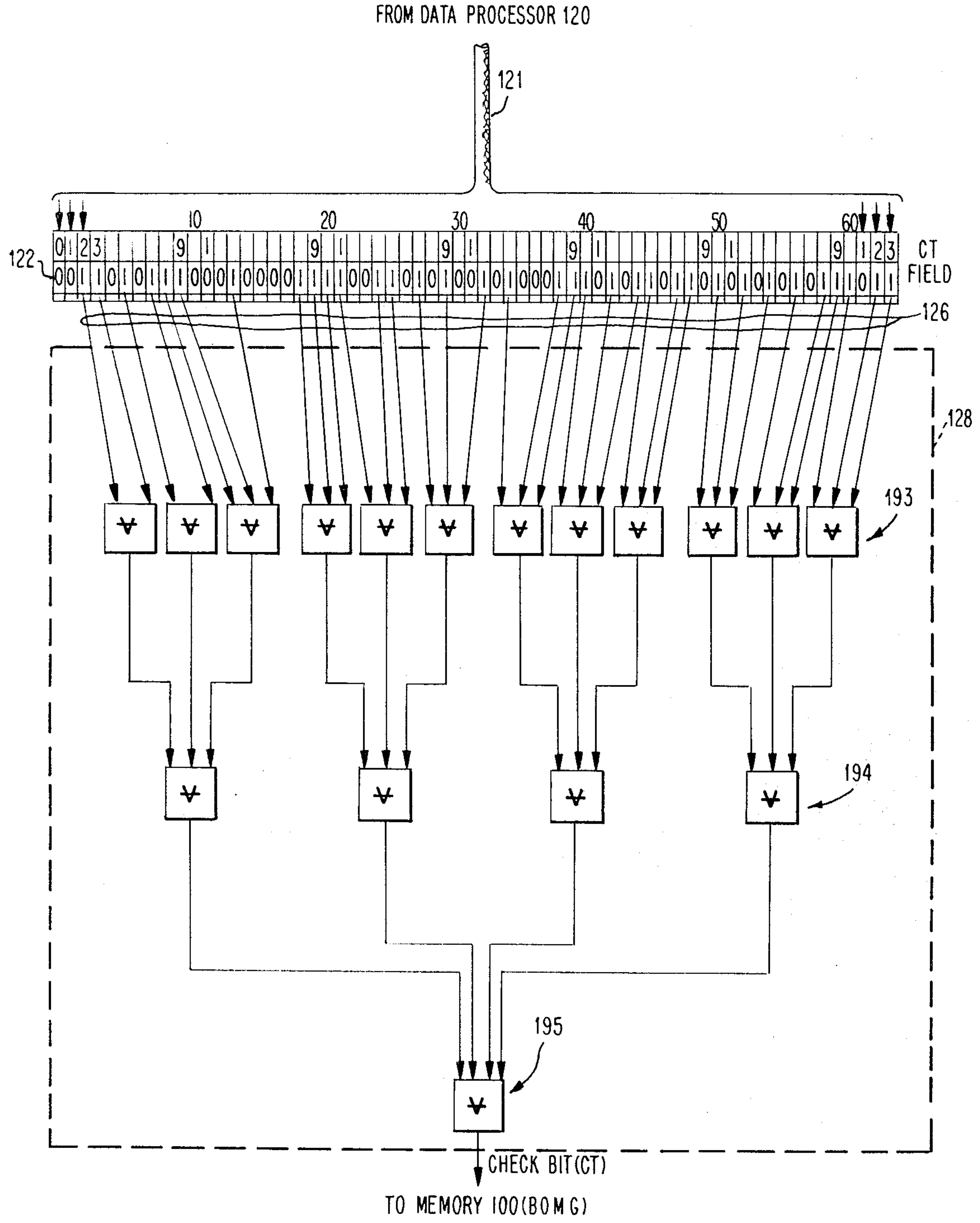

FIGS. 10 and 11 illustrate the preferred embodiment of sections of the check bit generator shown in block form in FIG. 2. It will be noted that the check bit generator is an encoder very similar to the syndrome generator in FIG. 4. The check bits are generated by EXCLUSIVE OR'ing the data bit positions for the particular check bit field established by the code.

FIG. 10 illustrates the C1 field which appeared in the H matrix of FIG. 3. The EXCLUSIVE OR trees 186, 187 and 188 illustrated in block 128 perform the same function as the EXCLUSIVE OR trees in FIG. 4. The check bit C1 is deposited in its associated BOM A.

FIG. 11 illustrates the circuitry required to calculate the overall parity check bit CT. It will be recalled that the syndrome bit ST is calculated in syndrome generator 109 by computing over all of the data and check bits. At first glance, it might appear that CT should be computed in the same fashion in check bit generator 128, i.e., by calculating over all data and check bit locations in register 122. However, this is unnecessary. It can be shown that the calculation of CT over all data and check bits is the logical equivalent of calculating over only certain data positions so as to make each DSCV in the H matrix odd weight. Hence CT is an odd-weight-column parity bit and its use improves the speed of encoding and reduces circuit requirements.

For example, by inspection of the H-matrix of FIG. 3, and ignoring row ST, it is evident that the vectors of columns 0 and 2 are odd and even, respectively. Thus, in calculating CT, data bit position 0 is not used but data bit position 2 is used. None of the check bit positions is used.

For the particular code cillustrated in FIG. 3, CT is calculated as follows:

$$CT = d(2) \oplus d(3) \oplus d(5) \oplus d(7) \oplus d(8) \oplus d(9) \oplus d(13) \oplus d(18) \oplus d(19) \oplus d(20) \oplus d(21) \oplus d(24) \oplus d(25) \oplus d(27) \oplus d(29) \oplus d(32) \oplus d(34) \oplus d(38) \oplus d(39) \oplus d(40) \oplus d(42) \oplus d(44) \oplus d(45) \oplus d(47) \oplus d(48) \oplus d(50) \oplus d(52) \oplus d(54) \oplus d(56) \oplus d(58) \oplus d(59) \oplus d(60) \oplus d(62) \oplus d(63). \quad 16$$

It should be noted at this point that ST cannot be computed reliably in this fashion because one or two of the check bits received from the memory 100 by the syndrome generator may be in error. Thus, ST must be calculated over all data and check bits.

Referring again specifically to FIG. 11, the circuit functions in a fashion similar to FIG. 10; the EXCLUSIVE-OR tree consisting of circuits 193, 194 and 195 in generator 128 perform a modulo 2 addition on the data stored in the selected locations of register 122 according to equation (12). The output bit CT is then stored in BOM G of memory 100.

OPERATION

The operation of the ECC system of this invention can now be profitably described. We begin by assuming that the data bits and the check bits are stored in their proper locations in memory 100. The check bits have been generated by check bit generator 128 in FIG. 2 according to the code of this invention and deposited in their respective BOM's. At this point certain of the data bits or check bits may have been written into the memory erroneously or, when the code word is read out of memory, some circuit defect may cause the bits to be in error. Assume for purposes of illustration that the data in bit locations 0 and 32 have been inverted due to some defect by the time they are located in input register 103. The data is clocked out of the register and is transmitted to syndrome generator 109 along with the check bits. The syndrome bits are generated by comparing the check bits received from the BOM locations with the check bits derived from the data bits. Because related bits 0 and 32 are in error the syndrome pattern (SEV) will be as follows:

$$SEV = \begin{vmatrix} S1 = 0 \\ S2 = 0 \\ S3 = 0 \\ S4 = 0 \\ S5 = 0 \\ S6 = 0 \\ S6 = 0 \\ S7 = 1 \\ S8 = 0 \\ S9 = 1 \\ S10 = 1 \\ S11 = 1 \\ S12 = 1 \\ ST = 0 \end{vmatrix}$$

As previously discussed in great detail, this pattern is unique to a double error stored in the data bit locations 0 and 32. This syndrome pattern is transmitted from the syndrome generator 109 to the syndrome decoder 112 which generates an output signal indicative of this particular related double error on cable 113 to data correction circuits 114 as well as a "correctable error" on the error indication lines. In this particular case, the EXCLUSIVE OR blocks 0 and 32 in data crrection circuit 114 reverses the signal indication of the uncorrected data at data locations 0 and 32. The output from data correction circuits 114 are 64 signals indicative of the correct data in each of the data locations in the memory. This corrected data may then be used reliably by data processor 120.

After the processor has used the data as in FIG. 2, the data is sent to the check bit generator 128 through register 122 where new check bits are computed. The data and the newly computed check bits are then returned to the main store 100.

SUMMARY

I have provided an error correction system which is unique in having the capability of correcting single errors and related double errors and in detecting unrelated double errors. The system features a unique error correction code which is devised from more basic codes.

While the invention has been particularly shown and described with reference to a preferred embodiment thereof, it will be understood by those skilled in the art that various changes in form and detail may be made therein without departing from the spirit and scope of the invention.

For example, in the standard ECC system means are provided for generating and checking the parity of each byte of a code word. The present specification has omitted all reference to this feature because it would constitute superfluous material, thereby detracting from the invention. In practice, byte parity circuits would be included in the present ECC system and their design is obvious to one skilled in ECC systems generally.

I claim:

1. In a data processing system, means for storing data bit sequences, each sequence consisting of a predetermined number of pairs of related information bits and check bits;

means for receiving said information bits; and means responsive to each sequence of data bits for selectively transferring said information bits from said storing means to said receiving means, said transferring means including means responsive to each data bit sequence for uniquely detecting and correcting all single data bit errors, uniquely detecting and correcting all related double data bit errors or detecting all non-related double data bit errors.

2. A data processing system as in claim 1 wherein said transferring means comprises:

means receptive of a data bit sequence from said storage means for generating syndrome patterns indicative of data bit errors;

means for decoding said patterns to uniquely locate all single errors and errors in a pair of related bits and to detect all double errors in unrelated bits.

3. A data processing system as in claim 2 wherein said check bits form three code groups, the first group representative of a first code having a capability of detecting single errors in said data bit sequence;

the second group in combination with said first group representative of a second code having a capability of locating errors in a pair of related bits and of locating single errors detected by said first code; and the third group containing an odd-weight-column parity bit to detect errors in two unrelated bits.

4. A system as in claim 3 wherein said syndrome pattern generating means comprises:

first and second syndrome check bit means for encoding the information bits transmitted from said storage means with said first and second codes thereby generating syndrome check bits, and for comparing each syndrome check bit with the corresponding check bits of said first and second code groups transmitted from said storage means;

third syndrome check bit means for encoding the information bits transmitted from said storage means with an overall parity check bit generated over all of the elements in said transmitted data bit sequence and for comparing the overall parity check bit with said odd-weight-column parity bit transmitted from said storage means;

whereby the comparison of each transmitted check bits with its corresponding syndrome check bits yield signals representative of syndrome error patterns.

5. A system as in claim 4 wherein said decoding means comprises:

means responsive to said signals representative of syndrome error patterns for transmitting individual signals indicative of a single error or a pair of related errors;

means responsive to said individual signals for generating an indication of which data bit or bits are in error.

6. A system as in claim 5 further comprising means responsive to said decoding means for correcting the data bit or bits in error.

7. A system as in claim 5 further comprising error indication means responsive to said signals representative of syndrome error patterns and said decoding means for signalling whether there is no error, a correctable single error, a correctable related double error or a non-correctable error in a data sequence.

8. A system as in claim 3 wherein:

said first code is a single error correction code devised over the first bit locations in each said pair and replicated over the second bit location in each said pair;

said second code includes minimum-3-weight-column, single error correction code devised over the first bit location in each said pair and spread over the second bit location in each said pair; and the code sequence generated by said first and second codes comprises a plurality of pairs of related check bit locations.

9. In combination in a data storage system including a source of information sequences, each said sequence comprising a plurality of pairs of related data bit locations, first parity check bit means responsive to an information sequence from said source for encoding said sequence with a first code having a capability of detecting single errors in said sequence;

second parity check bit means responsive to said information sequence from said source for encoding said sequence with a second code, the first and second code in combination having a capability of locating errors in a pair of related bits and of locating single errors detected by said first code; and third parity check bit means responsive to said information sequence from said source for encoding said sequence with an odd-weight-column parity bit to detect errors in two unrelated bits.

10. A combination as in claim 9 wherein said first code is a single error correction code devised over the first bit locations in each said pair and replicated over the second bit location in each said pair, and said second code is a minimum-3-weight-column, single error correction code devised over the first bit location in each said pair and spread over the second bit location in each said pair; and the code sequence generated by said first and second codes comprises a plurality of pairs of related check bit locations, the combination of said data bits and check bits being an encoded information sequence.

11. A combination as in claim 10 further comprising error-prone means for storing said encoded information sequences.

12. A combination as in claim 11 wherein said storage means comprises:

a first set of basic operational modules, each module containing a pair of related bit locations for each encoded information sequence;

another basic operational module, for storing said odd-weight-column parity bit for each encoded information sequence.

13. A combination as in claim 11 further comprising:

means receptive of an encoded information sequence transmitted from said error-prone storage means for generating syndrome patterns indicative of errors in said transmitted encoded sequence; and means for decoding said patterns to locate a single error and errors in a pair of related bits and to detect errors in unrelated bits.

14. A combination as in claim 13 wherein said syndrome pattern generating means comprises:

first and second syndrome check bit means for encoding the data bits transmitted from said storage means with said first and second codes thereby generating syndrome check bits and for comparing each syndrome check bit with the corresponding check bits encoded by said first and second parity check bit encoding means and transmitted from said storage means;

third syndrome check bit means for encoding the data bits transmitted from said error-prone storage means with an overall parity check bit generated over all of the elements in said transmitted encoded information sequence and for comparing the overall parity check bit with said odd-weight-column parity bit transmitted from said storage means;

whereby the comparison of each transmitted check bit with its corresponding syndrome check bit yield signals representative of syndrome error patterns.

15. A combination as in claim 14 wherein said decoding means comprises:

means responsive to said signals representative of syndrome error patterns for transmitting individual signals indicative of a single error or a pair or related errors;

means responsive to said individual signals for generating an indication of which data bit or bits are in error.

16. A combination as in claim 15 further comprising means responsive to said decoding means for correcting the data bit or bits in error.

17. A combination as in claim 15 further comprising error indication means responsive to said signals representative of syndrome error patterns and said decoding means for signalling whether there is no error, a correctable error or a non-correctable error in an encoded sequence.

18. In an error correction system operable to locate single errors and related double errors and to detect unrelated double errors in a codeword including an information sequence and parity check digits having first and second sets of data bit and check bit locations, respectively, each location in the first set related to a corresponding location in the second set, comprising:

means for providing an information sequence, means responsive to said information sequence for generating a first group of parity check bits in accordance with a first single error correcting code devised for said first set of data bits, the element values in each data location in said first set being replicated in the corresponding location in said second set;

means responsive to said information sequence for generating a second group of parity check bits in accordance with a second single error correcting code having a minimum-column-weight of three devised over the element values of said first set of data bits, the element values in each data location in said first set being spread into the data locations in said first and second sets;

the column vectors of said related data bits formed by said second group of parity check bits being different in at least one position;

means responsive to said information sequence for generating a parity check bit in accordance with an odd-weight-column code devised over the element values of each data bit location in said first and second parity bit groups;

means for applying said information sequence and parity bits to an error-prone storage system;

means receptive of said information sequence and parity bits from said storage system for encoding syndrome bits from said received information sequence and parity bits; and means for decoding said bits to identify a correctable single error, a related double error and an uncorrectable unrelated double error.

19. A system as in claim 18 wherein said decoding means comprises: means providing intermediate outputs according to logical combinations of selected syndrome bits, means for providing logical combinations of all of said syndrome bits to form syndrome error vectors indicative of single and related errors in the information and parity check sequence.

20. A system as in claim 18 further including error location indication means responsive to a signal from said decoding means for generating an indication of the data location or locations in error.

21. A system as in claim 20 further including means responsive to said error location indication means for correcting the bits in said erroneous data location or locations.

22. A system as in claim 21 wherein said data bit correcting means comprises a set of EXCLUSIVE-OR circuits, one for each data position, each one having a first input connection from a corresponding data bit location in said error prone storage system and a second input connection from a corresponding error location indication means, thereby providing a corrected data signal at its output.

23. In a data processing system:

means for storing a data bit sequence consisting of a predetermined number of pairs of related information bits and first check bits, means responsive to said information bits for generating a predetermined number of second check bits corresponding to said first check bits, means for comparing corresponding ones of said first and second check bits to generate a unique syndrome bit pattern, means responsive to said unique syndrome bit pattern for producing a signal identifying a single information bit error or a related double information bit error, and means responsive to said information bits and said signal identifying means for correcting said single information bit error or said related double information bit error.

24. A data processing system as in claim 23 wherein said first check bits form two code groups, the first group representative of a first code having a capability of detecting single errors in said data bit sequence, and the second group in combination with said first group representative of a second code having a capability of uniquely locating errors in a pair of related bits and of locating single errors detected by said first code.

25. A system as in claim 24 further comprising error indication means responsive to said syndrome bit pattern and said signal identifying means for signalling whether there is no error, a correctable single error or a correctable related double error.

26. A system as in claim 24 wherein:

said first code is a single error correction code devised over the first bit locations in each said pair and replicated over the second bit locations in each said pair;

said second code is a minimum-3-weight-column, single error correction code devised over the first bit location in each said pair and spread over the second bit location in each said pair; and the code sequence generated by said first and second codes comprises a plurality of pairs of related check bit locations.

27. In combination in a data storage system including a source of information sequences, each said sequence comprising a plurality of pairs of related data bit locations, first parity check bit means for encoding said sequence with a first code having a capability of detecting single errors in said sequence; and second parity check bit means for encoding said sequence with a second code, the first and second code in combination having a capability of locating errors in a pair or related bits and of locating single errors detected by said first code.

28. A combination as in claim 27 wherein said first code is a single error correction code devised over the first bit locations in each said pair and replicated over the second bit location in each said pair, and said second code is a minimum-3-weight-column, single error correction code devised over the first bit location in each said pair and spread over the second bit location in each said pair; and the code sequence generated by said first and second codes comprises a plurality of pairs of related check bit locations, the combination of said data bits and check bits being an encoded information sequence.

29. A combination as in claim 28 further comprising error-prone storage means responsive to said source of information sequences and said first and second parity check circuits for storing said encoded information sequences.

30. A combination as in claim 29 wherein said storage means comprises a set of basic operational modules, each module containing a pair of related bit locations for storing said encoded information sequence.

31. A combination as in claim 29 further comprising:

means receptive of an encoded information sequence transmitted from said error-prone storage means for generating syndrome patterns indicative of errors in said transmitted encoded sequence; and means for decoding said patterns to locate a single error and errors in a pair of related bits.

32. A combination as in claim 31 wherein said syndrome pattern generating means comprises:

first and second syndrome check bit means for encoding the data bits transmitted from said storage means with said first and second codes thereby generating syndrome check bits and for comparing each syndrome check bit with the corresponding check bits encoded by said first and second parity check bit encoding means and transmitted from said storage means;

whereby the comparison of each transmitted check bit with its corresponding syndrome check bit yields signals representative of syndrome error patterns.

33. A combination as in claim 32 wherein said decoding means comprises:

means responsive to said signals representative of syndrome error patterns for transmitting individual signals indicative of a single error or a pair of related errors;

means responsive to said individual signals for generating an indication of which data bit or bits are in error.

34. A combination as in claim 33 further comprising means responsive to said decoding means for correcting the data bit or bits in error.

35. A combination as in claim 33 further comprising error indication means responsive to said signals representative of syndrome error patterns and said decoding means for signalling whether there is no error or a correctable error in an encoded sequence.

36. In an error correction system operable to locate single errors and related double errors in a codeword including an information sequence and parity check digits having first and second sets of data bit and check bit locations, respectively, each location in the first set related to a corresponding location in the second set, comprising:

means for providing an information sequence, means responsive to said information sequence for generating a first group of parity check bits in accordance with a first single error correcting code devised for said first set of data bits, the element values in each data location in said first set being replicated in the corresponding location in said second set;

means responsive to said information sequence for generating a second group of parity check bits in accordance with a second single error correcting code having a minimum-column-weight of three devised over the element values of said first set of data bits, the element values in each data location in said first set being spread into the data locations in said first and second sets;

the column vectors of said related data bits formed by said second group of parity check bits being different in at least one position;

means for applying said information sequence and parity bits to an error-prone storage system;

means receptive of said information sequence and parity bits from said storage system for encoding syndrome bits from said received information sequence and parity bits; and means for decoding said bits to identify a correctable single error or a related double error.

37. A system as in claim 36 wherein said decoding means comprises: means providing intermediate outputs according to logical combinations of selected syndrome bits; and means for providing logical combinations of all of said syndrome bits to form syndrome error vectors indicative of single and related errors in the information and parity check sequence.

38. A system as in claim 36 further including error location indication means responsive to a signal from said decoding means for generating an indication of the data location or locations in error.

39. A system as in claim 38 further including means responsive to said error location indication means for correcting the bits in said erroneous data location or locations.

40. A system as in claim 39 wherein said data bit correcting means comprises a set of EXCLUSIVE-OR circuits, one for each data position, each one having a first input connection from a corresponding data bit location in said error prone storage system and a second input connection from a corresponding error location indication means, thereby providing a corrected data signal at its output.

41. In a data processing system, means for storing a data bit sequence consisting of a predetermined number of pairs of related information bits and first check bits;

means responsive to said information bits for generating a predetermined number of second check bits corresponding to said first check bits;

means for comparing corresponding ones of said first and second check bits to generate a syndrome bit pattern;

said syndrome bit pattern having a first unique configuration for indicating the absence of data bit errors, second unique configurations for indicating the presence of correctable single data bit errors, third unique configurations for indicating the presence of correctable related double bit errors or fourth configurations for indicating the presence of non-correctable double data bit errors, the fourth configurations being different from any of said third unique configurations; and means responsive to said syndrome bit pattern for producing a signal indicating the absence of data bit errors, the presence of a correctable single data bit error, the presence of correctable related double data bit errors or the presence of non-correctable double data bit errors.

* * * * *